United States Patent
Schnarel et al.

(10) Patent No.: US 6,975,712 B1
(45) Date of Patent: *Dec. 13, 2005

(54) COMMON VISUAL AND FUNCTIONAL ARCHITECTURE FOR PRESENTING AND CONTROLLING ARBITRARY TELEPHONE LINE FEATURES

(75) Inventors: Charles Schnarel, Woodinville, WA (US); Mauricio Lomelin, Redmond, WA (US); Peter G. Chin, Seattle, WA (US); Derek S. Graham, Seattle, WA (US); Kate Welker, San Francisco, CA (US); Robert C. Murdock, San Francisco, CA (US); Justin C. Cooper, Oakland, CA (US); Laurence Golding, Fremont, CA (US); Suzanne Walsh, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 10/143,344

(22) Filed: May 10, 2002

Related U.S. Application Data

(63) Continuation of application No. 09/383,039, filed on Aug. 25, 1999, now Pat. No. 6,389,124.

(60) Provisional application No. 60/098,187, filed on Aug. 26, 1998, provisional application No. 60/122,975, filed on Mar. 3, 1999.

(51) Int. Cl.[7] .......................... H04M 1/56; H04M 3/42
(52) U.S. Cl. .......................... 379/142.01; 379/142.15; 379/142.17; 379/201.03; 715/700; 715/744; 715/762
(58) Field of Search .................. 379/142.01, 201.03, 379/201.05; 719/318, 328, 329; 345/700, 345/716, 736, 744, 747, 748, 749, 762, 763, 345/765, 808, 809

(56) References Cited

U.S. PATENT DOCUMENTS 5,455,854 A * 10/1995 Dilts et al. ............. 379/201.04

(Continued)

FOREIGN PATENT DOCUMENTS

WO        WO 96/02049        1/1996

OTHER PUBLICATIONS

"Sun Microsystems: JavaBeans™," Version 1.01, Graham Hamilton (Ed.), Sun Microsystems Inc., pp. 1-114, Jul. 24, 1997.

(Continued)

*Primary Examiner*—Quoc Tran
(74) *Attorney, Agent, or Firm*—Klarquist Sparkman, LLP

(57) ABSTRACT

A user interface for screen phones monitors telephone line state information and displays user interface controls and telephone line status information dependent on the telephone line state. The user interface includes a display element referred to as a call slip that expands and collapses in response to changes in telephone line state and user input. The call slip updates the information that it displays based on telephone line state changes and information communicated from one or more telephony monitoring applications. The call slip displays user interface controls representing tasks that are dependent on information derived from a telephone call, such as caller ID information. The software used to control the display of call slips and to monitor telephone line state is part of a software platform that may be customized for a particular device or application. For example, an implementer may select default display elements and monitoring application programs from the platform and add custom display elements that communicate with the default programs via their programming interfaces.

52 Claims, 8 Drawing Sheets

U.S. PATENT DOCUMENTS

| | | | |
|---|---|---|---|
| 5,533,110 | A | 7/1996 | Pinard et al. |
| 5,657,378 | A | 8/1997 | Haddock et al. |
| 5,724,412 | A | 3/1998 | Srinivasan |
| 5,754,636 | A | 5/1998 | Bayless et al. |
| 5,799,068 | A | 8/1998 | Kikinis et al. |
| 5,974,468 | A | 10/1999 | Taylor et al. |
| 6,009,469 | A | 12/1999 | Mattaway et al. |
| 6,014,137 | A | 1/2000 | Burns .......................... 345/747 |
| 6,035,019 | A * | 3/2000 | Hara ....................... 379/93.05 |
| 6,049,334 | A | 4/2000 | Bates et al. .................. 345/755 |
| 6,091,808 | A * | 7/2000 | Wood et al. ........... 379/201.04 |
| 6,134,017 | A | 10/2000 | Schlank et al. |
| 6,178,432 | B1 | 1/2001 | Cook et al. .................. 707/513 |
| 6,208,879 | B1 | 3/2001 | Iwata et al. .................. 455/566 |
| 6,331,864 | B1 | 12/2001 | Coco |
| 6,389,124 | B1 * | 5/2002 | Schnarel et al. ....... 379/142.01 |
| 6,429,882 | B1 | 8/2002 | Abdelnur et al. |
| 6,469,713 | B2 | 10/2002 | Hetherington et al. |
| 6,496,202 | B1 | 12/2002 | Prinzing |
| 6,504,555 | B1 | 1/2003 | Slupe et al. |
| 6,735,208 | B1 * | 5/2004 | Riemann et al. ............ 370/401 |

OTHER PUBLICATIONS

Frazier, "Plug-in for Graphics Apps Adds Power to Special Effects," *Government Computer News*, vol. 16, No. 26, pp. 36-37, Sep. 1, 1997.

Amadio, "Phone Ahead: A New Breed of High-Tech Telephones Makes Doing Business Easier Than Ever," *Entrepreneur*, vol. 25, No. 12, pp. 56-58, Nov. 1997.

"Cool Stuff '98," *Computerworld*, vol. 31, No. 51, pp. 62-67, Dec. 22, 1997.

Rupley, "Feed Your E-mail Addiction," *PC Magazine*, vol. 16, No. 2, p. 10, Jan. 21, 1997.

"Uniden Spins Axis E-mail Telephone," *PC Week*, vol. 13, No. 45, p. 47, Nov. 11, 1996.

Bowles et al., "US West Brings Display-Based Telephony to Residential Customers with Nortel System," *Telecommunications*, vol. 30, No. 3, p. 82, Mar. 1996.

Kopf, "Perking Consumer Internet Use: Are Java-Powered Screen Phones the Answer?" *America's Network*, vol. 100, No. 12, pp. 108-110, Jun. 15, 1996.

Davey, Nortel Dialing Up Web Phones, *PC Week*, vol. 13, No. 21, p. 10, May 27, 1996.

*Getting Results with Microsoft Office 97*, Microsoft Corporation, pp. 113-126 and 348-352, 1997.

"OL97: How to Add an Address to Your Contacts Folder from an E-mail Message," http://support.microsoft.com/support/kb/articles/Q258/6/17.ASP?LN=EN-US&SD=gn&FR=0&, P.1, 2001.

Doan, "Add-ins Give Outlook a Boost," *InfoWorld*, vol. 19, No. 32, p. 26, Aug. 11, 1997.

"Outlook Frequently Asked Questions," http://www.usi.edu/usihelp/outhelp/cntctfaq.htm, pp. 1-3, last modified Mar. 1, 1999.

"Uniden's Axis Telephone Terminal," pp. 1-2, http://www.uniden.com/au.

"Alternative Web Access via TV and Telephone," pp. 1-4, http://pimall.com/nais/n.ephon.html.

"This is the *Cordless Version* of your Mother's Email Machine," pp. 1-2, http://www.telephone-guys.com/axis2.htm.

"Powertouch 350 Kit Charcole Specification," p. 1, http://www.gy.com/spec/uxaj.htm.

"Northern Telecom PowerTouch 350," pp. 1-2, http://www.commsource.com/ntpt350.html.

"BellSouth Telephone Products," pp. 1-3, http://www.bellsouth.com/blsc/maestro.html, 1997.

"PowerTouch," p. 1, http://ltlcs.gte.com/power.htm.

"PowerTouch Specifications," pp. 1-3, http://ltlcs.gte.com/ptspec.htm.

"PowerTouch Phones," p. 1, http://widts.gte.com/Shopping/pwrtch.htm, 1999.

"Press Releases Archive, Jan. 9, 1997," pp. 1-2, http://www.news.philips.com/archief/199701092.html, Jan. 9, 1997.

"Tek Discount Warehouse," pp. 1-2, http://www.discountwarehouse.com/tekgallery/norpow350.html.

*Teleport 33.6 Speakerphone Edition, User's Guide*, pp. I-105, Global Village Communication, Inc., 1996.

"CIDCO iPhone- Introduction," p. 1, http://www.cidco.com/iphone/intro2.html, visited on Feb. 10, 1999.

"Alcatel Telecom- One Touch," pp. 1-2, http://www.alcatel.com/telecom/mbd/products/products/detailed/term/otouch.htm, visited on Feb. 16, 1999.

"Alcatel Telecom- Technical Specs," pp. 1-2, http://www.alcatel.com/telecom/mbd/products/products/detailed/term/tech.htm, visited on Feb. 16, 1999.

"Alcatel's Internet Screenphone Based on Sun's PersonalJava™ and JavaOS for Consumers™ Wins CeBIT Oscar Best Communications Products 1998," pp. 1-2, http://www.sun.com/javaos/consumers/oscar98.html, visited on Fab. 16, 1999.

"CIDCO and Sun Announce Licensing Agreement Intended to Create New Consumer Internet Appliances Based on JavaOS for Consumers™ Software," pp. 1-4, http://www.sun.com/javaos/consumers/press4.98.html, visited on Feb. 16, 1999.

"Southwestern Bell Catalog," pp. 1-2, http://www.swbell.com/ , visited on Feb. 10, 1999.

*AT&T Personal Communications Center User Guide*, Graphics © AT&T 1995.

*Teleport, TelePort 33.6 Speakerphone Edition User's Guide*, Global Village Communication, 1144 East Arques Ave., Sunnyvale, CA 94086, 1996.

*CIDCO iPhone Screen Phone*, http://www.cidco.com/iphone/intro2.html printed from the Internet Feb. 10, 1999.

*One Touch ™ Alcatel Internet Screenphone*, http://www.alcatel.com/telecom/mbd/products/products/detailed/term/otouch.htm printed from the Internet Feb. 16, 1999.

*Technical Specs, Alcatel Internet Screenphone*, http://www.alcatel.com/telecom/mbd/products/products/detailed/term/tech.htm, printed from the Internet Feb. 16, 1999.

*Alcatel's Internet Screenphone Based on Sun's PersonalJava ™ and JavaOS for Consumers ™ Wins CeBIT Oscar Best Communications Product 1998*, http://www.sun.com/javaos/consumers/oscar98.html printed from the Internet Feb. 16, 1999.

*CIDCO and Sun Announce Licensing Agreement Intended to Create New Consumer Internet Appliances Based on JavaOS for Consumers ™ Software, Sun Press Releases*, Apr. 13, 1998, http://www.sun.com/javaos/consumers/press4.98.html printed from the Internet Feb. 16, 1999.

*Telephones & Equipment*, CST 2100 Corded Screenphone, http://www.swbell.com/ printed from the Internet Feb. 10, 1999.

U.S. Appl. No. 09/383,042, filed Aug. 1999, Schnarel et al.
U.S. Appl. No. 09/383,038, filed Aug. 1999, Schnarel et al.

* cited by examiner

FIG. 3
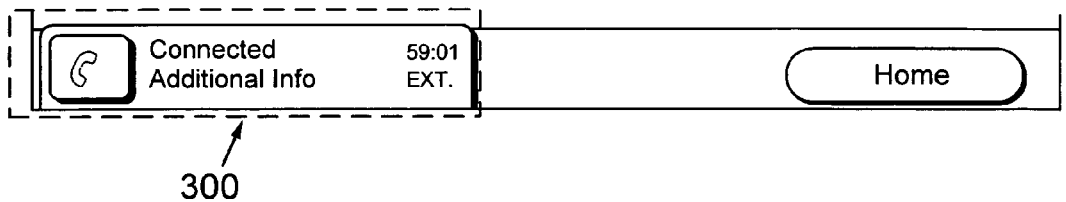
300
FIG. 4
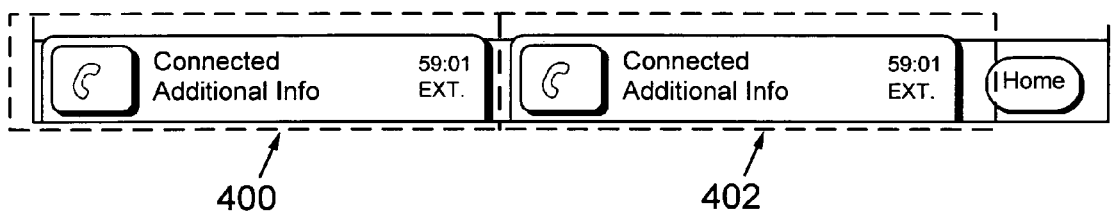
400     402
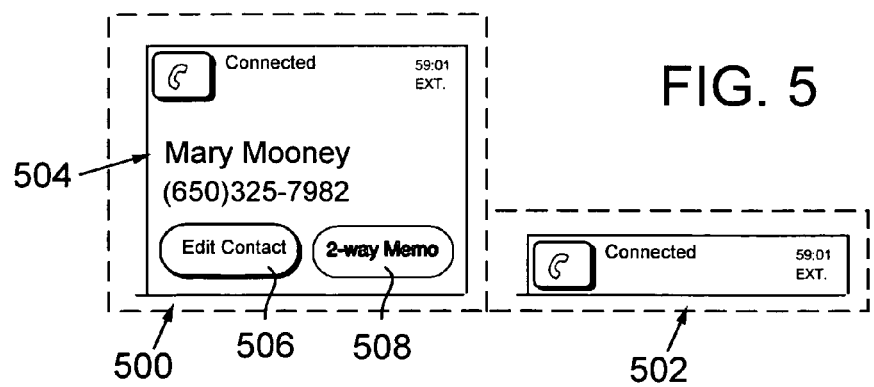
FIG. 5
504     500   506   508     502

COMMON VISUAL AND FUNCTIONAL ARCHITECTURE FOR PRESENTING AND CONTROLLING ARBITRARY TELEPHONE LINE FEATURES

CROSS REFERENCE TO RELATED APPLICATIONS

This patent application is a continuation of and claims priority to U.S. patent application Ser. No. 09/383,039, filed Aug. 25, 1999 now U.S. Pat. No. 6,389,124, which claims priority to U.S. Provisional Patent Application Nos. 60/098,187, filed Aug. 26, 1998, and 60/122,975, filed Mar. 3, 1999, all of which are hereby incorporated herein by reference.

FIELD OF THE INVENTION

The invention relates to telephony systems, and more particularly, relates to graphical user interfaces and software architectures for telephony devices.

BACKGROUND OF THE INVENTION

Today's telephony devices are becoming increasingly more sophisticated. A driving force of this trend is the convergence of functionality typically found in computers with functionality found in conventional telephones. One significant example of the convergence of phones and computers is a class of devices called screen phones. Though the specific hardware configuration of these devices varies widely, they typically share common elements such as a screen display, hardware buttons, telephone line interface hardware and a processor. Despite the advanced features that many of these devices provide, there is still need for improvement in many areas.

First, some screen phones available today have a small text-based display, typically arranged in a matrix of characters, and hardware buttons around the screen that are associated with specific screen areas to create virtual or soft buttons. This allows new functions to be programmed in to the buttons over time, or as a result of navigating through menu choices with the buttons. Usability testing and research have shown that the mapping of a physical button and the on-screen text is often confusing and hard to follow.

Another problem is that traditional enhanced telephony services are difficult to use (such as call forwarding) because they require the user to remember arbitrary sequences of key-presses, and remember sequences of operations without explicit feedback (feedback tones or clicks).

An additional problem with the screen phone industry is the lack of an extendable, flexible software architecture that allows others to build a rich array of functions and application programs. Screen phones tend to be highly specialized devices constructed with special hardware and software to support a set of features. As such, they are difficult to customize or extend to support new features.

This lack of flexibility is particularly problematic in view of the lack of uniformity in the telephone network—where infrastructure components vary from region to region, country to country, and service provider to service provider. Each area may provide Caller ID, but these areas may supply it using different technologies, or supply Call Forwarding, but use different access codes.

The problems associated with architectural flexibility extend beyond the challenges raised by differences in central office switching, hardware, and configuration. The underlying telecommunication network infrastructure is changing as well, and telephony devices must be adaptable to these infrastructures. For example, the telephone architecture should support choices between conventional infrastructures such as PSTN and ISDN. Looking to the future, the use of the Internet Protocol may become more commonplace as a telephone network infrastructure, and thus, there is a need to make telephony architectures readily adaptable to a variety of network infrastructures.

SUMMARY

The invention provides a user interface and related telephony program architecture for telephony devices. While aspects of the invention are particularly well suited for telephones with screen displays (e.g., screen phones), they apply to other telephony devices as well such as modems, answering machines and personal digital assistants.

One aspect of the invention is a user interface (UI) feature of a telephony device, which exposes line management and call control features in a user interface element called a "call slip." This user interface includes a variety of features that are unique, whether used alone or in combination with other features.

The call slip UI element occupies a portion of the display screen of a telephony device. To convey telephone line state information, the call slip UI reacts to changes in telephone line state and displays line specific status information. The call slip UI is sometimes referred to as being "state-smart", meaning that it presents different user options and line status information based on the state of the telephone, such as ringing or idle. It also changes the user options that it presents in response to events that occur in those states.

In one implementation, the call slip has two modes: expanded mode and collapsed mode. In response to events where telephone line status is more critical to the user, the call slip UI element is displayed in an expanded state in the foreground of the screen. For example, it expands to the expanded state in response to phone line related user input or in response to telephone events. Conversely, in response to events where the line state is less critical, the call slip becomes less prominent relative to other screen elements on the display.

The call slip may be adapted to provide the user with information and user interface controls to control the phone based on the state of the telephone call. This feature prevents the user from having to remember how to initiate a variety of advanced phone features, and also makes the display less cluttered. For example, the call slip UI element can be adapted to expand, collapse, and change the information and control options that it provides in response to changes in device or telephone line state. As such, it displays context sensitive information relative to the state of the telephone line (e.g., what is happening on the telephone line during a call) and other software in the system (what other software components are installed and what other data is already available in the system).

In one implementation, the call slip is visible from all display screens (i.e., regardless of the application program that is currently running, the call slip remains at least partially visible), and there is a call slip user interface element for each phone line. However, this feature is not an absolute requirement.

The call slip is extensible so that it can be modified to display information and control options added by a third party. In particular, the call slip has plug in regions called "panes" that display information for plug-in code modules. Call slips are implemented as part of a software platform that may be adapted to a variety of telephony devices and applications. In this platform, the software that controls the display of a call slip creates an instance of a call slip object for each call slip display element. The call slip object has a programming interface for receiving telephone line state changes and information, such as caller ID information, from programs that monitor the telephone line, called telephony monitoring applications.

The software platform includes default call slip objects and user interface controls that control the display of information and user options within a call slip. The system implementer may develop a call slip display element by selecting one or more default panes to include in a call slip, and by adding custom panes and user interface controls. In addition, the system implementer may select telephony monitoring applications provided in the software platform, or create custom monitoring applications. The telephony monitoring applications may communicate changes in telephone line state and telephone line information to the call slip, and its panes and user interface controls, via the programming interfaces of the call slip, and of the call slip panes and controls. A telephony monitoring application and a call slip control may also agree on a private interface for communicating events and information between them.

Another aspect of the call slip UI is that it may be updated dynamically and remotely. The call slip UI is dynamic in that it reacts in response to telephone company services (e.g., deluxe call waiting) and displays appropriate call information and control options in response. A related feature is the ability of a third party to control telephone features made available through the call slip UI from a remote location. For instance, a telephone company may download a new call slip control that enables the telephony device to access a new telephony feature such as a feature that allows the user to view caller ID information from an incoming call while another call is in progress on the same line.

BRIEF DESCRIPTION OF THE DRAWINGS

FIG. 3 shows a collapsed call slip for a single line telephony device.

FIG. 4 shows two collapsed call slips side by side for a two-line telephony device.

FIG. 5 shows an expanded and collapsed call state, side-by-side, to illustrate differences between these display states.

DETAILED DESCRIPTION 1.0 Introduction

Figure 1:
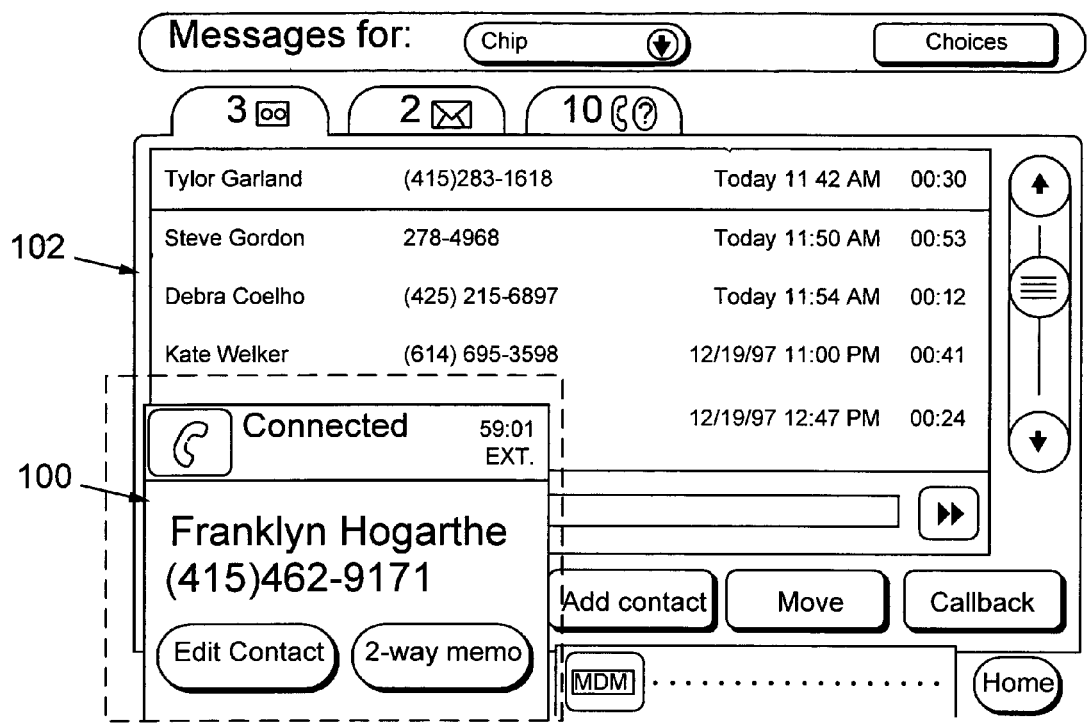
FIG. 1 shows one implementation of a call slip display element displayed on top of the UI of an application program called the message center.

The invention is implemented in a software platform for a category of products referred to as "Web Telephones." A Web Telephone integrates voice telephony, Internet access including e-mail and Web browsing, an answering machine, and possibly other communications media such as fax and voice mail, into a single device. While this platform is designed for web telephones it also applies to a variety of telephony devices, including virtually any device that has access to a telephone network line (cable modem, ISDN, DSL, wireless, plain old telephone line, packet switched networks or Wide Area Networks that support telephone calls such as the Internet).

While the software platform provides a fully functional user interface, and application programs, it is designed to expose programming interfaces and customizable features that allow others to modify its software components and user interface as well as add new software applications. The current implementation of the software platform interfaces with the Windows® CE Operating System, a subset of the Telephony Application Programming Interface (TAPI), and device drivers. Building on these components, it further provides a shell, application-level telephony applications, and integrated application programs such as e-mail, address book, web browser, and a message center. Each of these components is described in U.S. Provisional Application Nos. 60/098,187 and 60/122,975, which are hereby incorporated by reference.

2.0 Call Slip UI

The call slip user interface exposes line management and call control features in a single user interface element. The user-interface is state-smart, meaning that it presents different options based on the state of the telephone, such as ringing, receiving Caller ID information, Caller ID on Call Waiting, etc. The term "call slip" refers to the portion of the user interface software that displays line status information and manages user on-screen interaction with the telephone line.

In the current implementation, the graphical representation of the call slip has two modes: expanded mode and collapsed mode. There is one call slip per phone line, located in a dedicated area of the screen. Call slips are visible and accessible from all screens. When the phone is idle, the call slip is in a collapsed state. It expands to the expanded state in response to user input or in response to telephone events (i.e. an event occurs where it can be assumed that the user will want to be able to see either more of the call slip or more of the screen 'behind' the call slip).

The state-driven approach enables the call slip to provide only information that is relevant to the current state, and as a result, it avoids overloading the user with useless and distracting information.

Each call slip is a discrete unit, capable of displaying all information relevant to the line with which it is associated. This is preferable because it dictates that the behavior of any individual call slip will provide a similar user experience regardless of the number of telephone lines available in the device. This also has the desirable effect of maintaining a consistent user interface for any application that is controlling a phone line, and for any type of network interface, e.g., PSTN, ISDN, ASDL, cable modem, packet switched networks, Ethernet telephony, etc. The user always knows where to look to see if a line is in use.

The call slip appearance is modified according to the application that is currently using the line. For example, the call slip will expose different information and controls while the line is in use by the modem than while the line is in use by voice or fax machine.

2.1 Call Slip Window

FIG. 1 shows one implementation of a call slip element (100) displayed on top of the UI for a message center application in the background (102).

Figure 2:
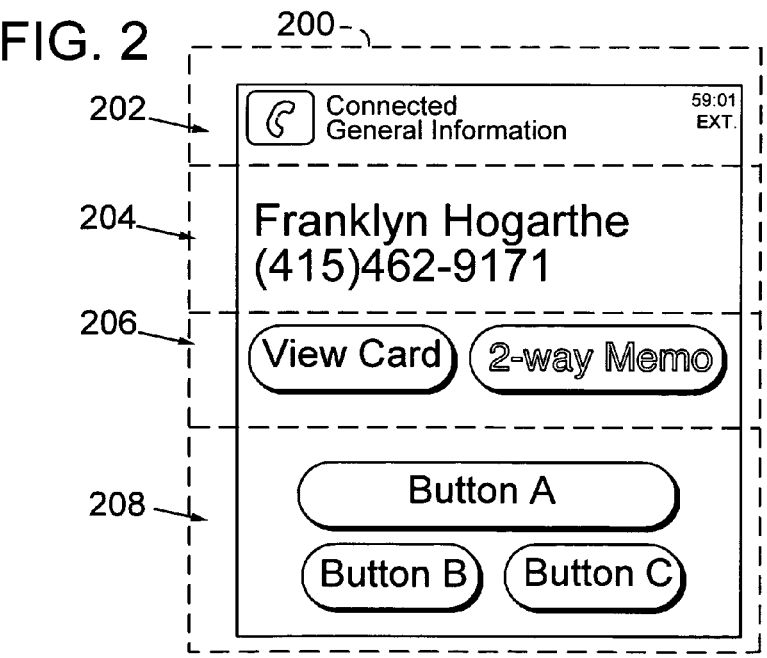
FIG. 2 shows an example of an expanded call slip and its constituent display elements.

As shown in FIG. 2, the current implementation of the call slip UI is composed of the following display elements:

The call slip window itself (200).

the summary status pane (202) is used to display general information about the line, such as the duration of the connection, indication of Parallel Set Detection (PSD), the line status, and general call information. The summary status pane is always visible to the user regardless of whether the call slip is collapsed or extended. One exception, however, is when the user interface is in full screen mode. In this case, the call slip or call slips are not visible when collapsed.

The call information pane (204) is used to display general information about the call, specifically the name and number of the calling party. For incoming calls, this name and number data is derived from Caller ID/Caller ID on Call Waiting information (when available) or from a contact database on the device. For outgoing calls (e.g., when the user invokes an automated dial feature), it is obtained from the contact database. Furthermore, this area is used to display DTMF digits during an outgoing call.

The call slip control pane(s) (206, 208) may be used to display line state-specific and application-specific controls. The call slip may contain multiple call slip control panes or no call slip controls pane at all. The implementer is free to add additional call slip control pane(s). These panes may contain any of the GUI control elements provided by the software platform UI (e.g., buttons, scroll bars, check boxes, etc.)—with the exception of those controls which do not physically fit (e.g., list boxes). These controls may be used for any purpose. For example, a text field may be added which displays the number of metering pulses that a line has received. The software platform includes a default call slip control pane with pre-configured buttons. These buttons provide advanced control of the telephony device. An implementer is free to remove these buttons, or add buttons for initiating other features. Call slip control panes are designed to be visible when the call slip is extended.

While the panes in the above example are rectangular, they can be drawn into a variety of arbitrary shapes, at a variety of places on the screen, and occupy a variety of portions of the device's screen display. Preferably, collapsed call slips are located at the outer perimeter of the display screen. FIG. 3 shows a collapsed call slip (300) for a single line device. The call slip is located at the bottom left portion of the display screen. FIG. 4 shows two collapsed call slips (400, 402) side by side for a two-line device.

As shown in FIG. 5, the expanded state (500) of the display extends outward from the collapsed state (502) and offers additional telephone line information (504) (e.g., the calling/called party and telephone number) and user interface controls (e.g., buttons to initiate program tasks (506, 508)) that operate on or relate to line state data. For instance, the edit contact button initiates a program task to add the caller's name and phone number from the caller ID information to the contact database.

Figure 6:
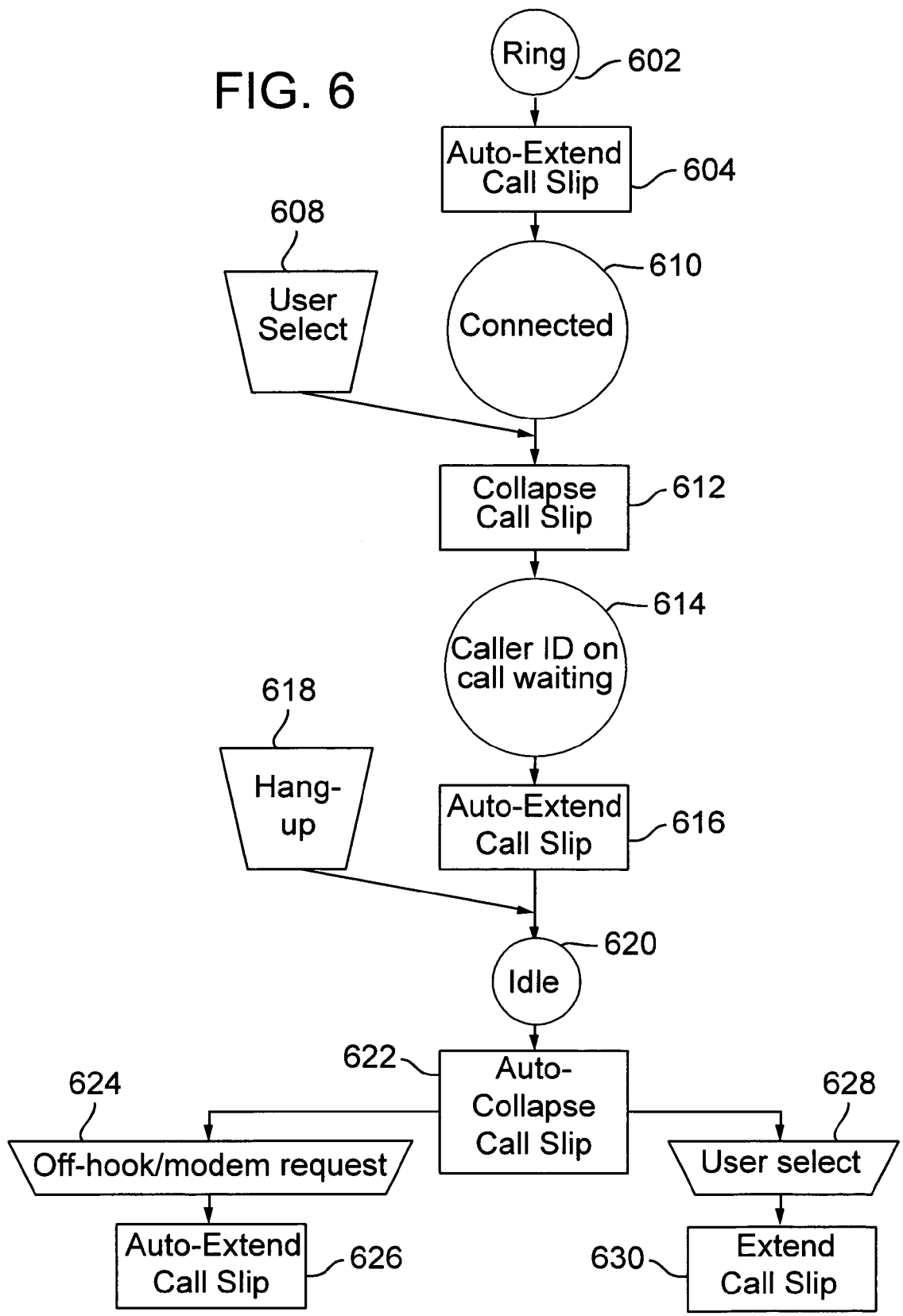
FIG. 6 illustrates an example of a state diagram to illustrate how the call slip UI element reacts to changes in telephone line state and user input.

The call slip UI software works in conjunction with software that monitors the phone line. A number of application programs may be monitoring the phone line, and each can communicate with the call slip UI to present status and line control options to the user. An example of a state diagram of a telephone is shown in FIG. 6. FIG. 6 illustrates phone states as circles, call slip actions with rectangles, and user input events with trapezoids. When the phone rings (602), TAPI implementation code notifies a client of TAPI, called the Operator Agent, of the change in phone state. The Operator Agent, in turn, notifies a call slip manager process, which executes the call slip UI code. In response, the call slip UI code animates the call slip UI element such that it extends to the expanded state (604). When a connection is established, the phone state transitions to the connected state (610).

When the call slip UI is extended, the user may manually collapse it by selecting it (608), such as by touching the portion that it occupies on the screen in a touch screen implementation. This form of user input is passed from the input device driver, to the operating system, and finally to the window procedure of the call slip. In response, the call slip UI code animates the call slip UI element such that it appears to slide into the collapsed state.

During a call, the call slip may toggle between the expanded and collapsed states in response to user input, changes in phone state, network signals, or the expiration of a timer. For example, if the phone receives caller ID on call waiting (614), a Telephony Monitoring Application (TMA) passes this information to the call slip process. The call slip UI code then extends the UI element to the expanded state (616) and fills in an information field with the caller ID information. In addition, as noted above, the call slip UI code may also present UI controls in response to the call state information, such as the edit contact button.

When the user hangs up (618), the phone state transitions to the idle state (620). A program module called the Voice Transport (VT) communicates this change in state to the call slip process, which in turn, collapses the call slip UI element (622).

When the phone line is idle, the call slip UI expands automatically when the phone line is placed off-hook (624), by the user activating the speaker phone, initiating a speed dial, or initiating a modem connection. In each of these cases, a TAPI client application communicates a change in state to the call slip process, which extends the call slip to the expanded state in response. The user may also expand the call slip when the phone is idle by selecting the collapsed call slip UI element on the display (628). The platform software communicates this input event to the call slip process as described above.

In the above example, there are two methods of triggering a change in the display state of the call slip UI element: 1) in response to user selection of the call slip UI element; and 2) in response to changes in the telephone line state. The first method is referred to as a manual action, e.g., manual extend or collapse, while the second method is referred to as an automatic action, e.g., auto-extend or auto-collapse.

The following discussion provides additional examples of the "state-smart" attributes of the call slip UI element. Its behavior is responsive to changes in state of the phone line as well as the state of software programs installed in the device.

Figure 7:
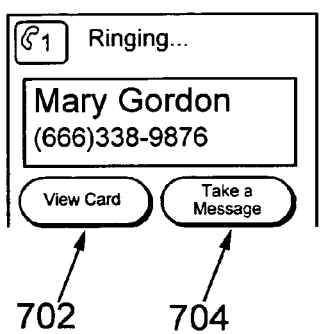
FIG. 7 shows an example of a call slip display element displaying Caller ID information.

The image shown in FIG. 7 shows how the call slip might look when displaying Caller ID information. Notice that the view card button (702) is state-smart as well. It has detected that the caller is already in the address book and has selectively displayed the "edit contact" button instead of the "add contact" button. The call slip has selectively included the "Take a Message" button (704) on the application software available on the device. This feature is only available if the user has an answering machine in their phone. Once the answering machine has taken the call, the call slip is updated appropriately to indicate that the "Take a Message" button is no longer available (different state).

Figure 8:
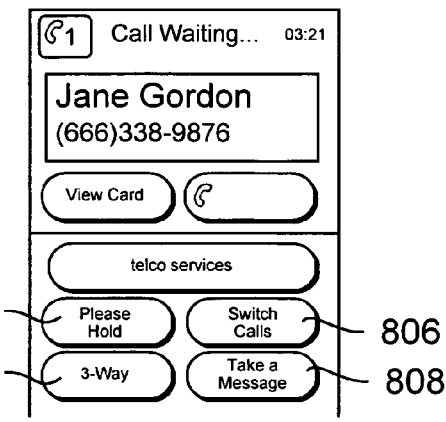
FIG. 8 shows an example of a call slip display element to illustrate how it displays caller ID information in response to a call waiting signal that includes caller ID information.

In a more complicated example shown in FIG. 8, the user is already on the phone and has received a call waiting signal that includes caller ID information (variously called Call Waiting Deluxe, Caller ID on Call Waiting, etc. by different Bell operating companies).

Call Waiting Deluxe offers users several options when they receive a second call such as, play a "please hold" message (802), or join the calls (804), switch calls (806), or take a voice message (808). In this example, these enhanced features have been implemented as feature buttons that play the right signals back to the switch to carry out these commands.

The following sections describe further implementation details for each of the panes in the call slip window.

2.2 The Summary Status Pane

Figure 9:
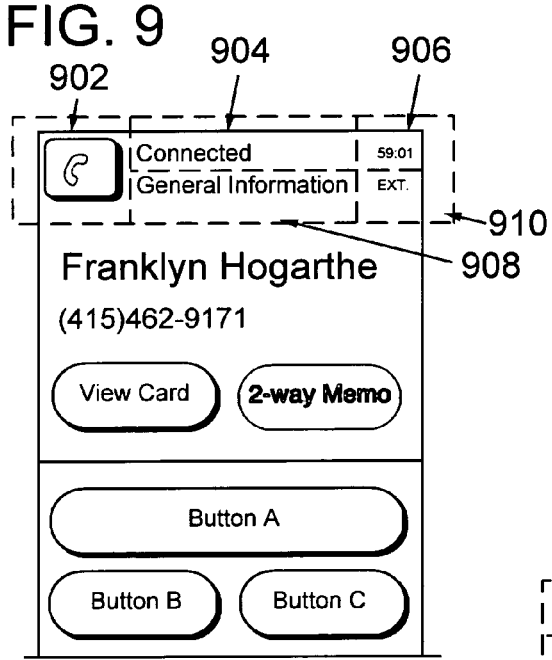
FIG. 9 shows an example of a call slip illustrating fields in the summary status pane.

In the current implementation, the summary status pane is always visible, even while the host call slip element is collapsed. In light of this attribute, the summary status pane is used to display general information about the line that the user will find useful at all times. FIG. 9 provides an example of a call slip illustrating fields in the summary status pane.

The summary status pane includes the following fields:

The idle bitmap is displayed if the line state is IDLE.

The application bitmap button (902) informs the user of which application is using the line. In this case, it displays an icon of a telephone indicating that an interactive voice call manager application is using the phone line.

The line status field (904) is used to display general line status information.

The duration of connection field (906) is used to track the total contiguous time that the line state has not been IDLE.

The general information field (908) displays additional information about the call. If the call slip is extended, then this field is empty.

The parallel set detection icon (910) is displayed to indicate that a parallel set has been detected.

The user may extend or collapse the call slip by selecting any portion of the summary status pane.

2.2.1 The Application Bitmap

The application bitmap (902) is located in the upper left-hand corner of the call slip window and is used to inform the user of which application is currently using the line. It may animate to display line activity.

2.2.2 Line Status Field

The line status field (904) displays messages as the line state changes and other events are received. The type of messages displayed in this field depend on the application program currently in control of the telephone line, such as the interactive voice call manager, answering machine, fax machine, or modem application. Tables 1–4 below summarize examples of line status messages that may be implemented.

Table 1 shows interactive voice states and the corresponding messages.

TABLE 1

| STATE | MESSAGE | COMMENT |
| --- | --- | --- |
| CHECK LINE | "Check the line!" | A 'live' line is not plugged into the RJ-11 Jack. |
| IN USE | "In use" | A special instance of Parallel Set Detection, wherein a telephone set which shares the same line as the device is off-hook AND the device is IDLE. Note, if the device is not IDLE, then Parallel Set Detection is indicated only via the Parallel Set Detection Icon. Technically a sub-state of IDLE. |
| IDLE | :<BLANK> | The phone is on-hook no Parallel Set is detected and the user is not using the ON-HOOK DIALING feature. |
| INCOMING RING | "Incoming call . . ." | The near-end is ringing. |
| READY/DIAL TONE | "Ready to dial . . ." | The user has generated an off-hook event while the phone was IDLE. 'Ready to dial . . .' is displayed until the user initiates a dial sequence either by pressing a Dialpad Button or initiating an Automated-dial Button. |
| CONNECTED | "Connected" | The far-end and the near-end are connected. For outgoing calls, a timer is used, so this description may not accurately describe the state of the line. See 'Dialing . . .' for details. For incoming calls, the device will know when connect takes place. |
| DIALING (CONNECTED): | "Dialing. . ." | The user has generated an off-hook while the device was IDLE. This uses a timer to change to 'Connected'. Technically, a sub-state of CONNECTED. |

TABLE 1-continued

| STATE | MESSAGE | COMMENT |
|---|---|---|
| HOLD (CONNECTED) | "On hold" | The line is CONNECTED and on HOLD. This means that the Handset's or Speakerphone's microphone and speaker are muted. Technically, a sub-state of CONNECTED. |
| MUTE (CONNECTED) | "Muted" | The far-end can be heard over the handset or speakerphone, but the microphone is disabled. Technically a sub-state of CONNECTED. |

Table 2 shows answering machine line states and the corresponding messages.

TABLE 2

| STATE | MESSAGE | COMMENT |
|---|---|---|
| ANSWERING | "Answering call . . ." | This message may be used to indicate that the Operator Agent has answered the call. In implementations where the Operator Agent is configured to detect the media mode, it may be displayed while the Operator Agent is determining the media mode by listening for tell-tale audio signals. |
| GREETING | "Playing greeting . . ." | The Answering Machine is playing the Greeting. |
| ALERT/FULL | "Answering sys full" | The Answering Machine is full. The default Answering Machine is Full Greeting is being played. |
| RECORDING | -"Recording . . ." | The Answering Machine has picked up the call and the far end is leaving a message. If Call Screening is on, then the user can hear the far end leaving a message. |
| REMOTE | "Remote access" | The Answering Machine has picked up the call and the far-end has entered the Remote Access system. |
| DISCONNECTING | "Disconnecting . . ." | The far-end party has disconnected, or the Caller has run out of time and the Answering Machine has hung-up. |

Table 3 shows fax line states and the corresponding messages.

TABLE 3

| STATE | MESSAGE | COMMENT |
|---|---|---|
| FAX DIALING | "Dialing . . ." | The line has been taken off-hook and the modem is dialing. |
| FAX BUSY | "Fax busy". | The line is busy. |
| FAX REDAIL | "Redial. Attempt: N" | The Fax is attempting the call again. |
| FAX WAITING | "Waiting to connect . . ." | The Fax has finished dialing and is waiting for Fax tones. |
| FAX CONNECTING | "Connecting . . ." | Fax tones are detected and the Fax is negotiating with the far-end. |
| FAX CONNECTED | "Fax connected" | Negotiation is completed. |
| FAX SEND | "Sending fax . . ." | The far-end and near-end are connected, and the near-end is transmitting. |
| FAX RECEIVE | "The far-end is transmitting . . ." | The far-end and near-end are connected, and the far-end is receiving. |
| FAX DISCONNECTING | "Disconnecting . . ." | The Fax is hanging up. |
| FAX INCOMING | "Incoming call . . ." | The device is Fax-capable and a call has been received. |

Table 4 shows modem line states and the corresponding messages.

TABLE 4

| STATE | MESSAGE | COMMENT |
|---|---|---|
| CHECK LINE | "Check the line!" | A 'live' line is not plugged into the RJ-11 Jack. |
| IN USE | "In use" | A special instance of Parallel Set Detection, |

TABLE 4-continued

| STATE | MESSAGE | COMMENT |
|---|---|---|
| | | wherein a telephone set which shares the same line as the device is off-hook AND the device is IDLE. Note, if the device is not IDLE, then Parallel Set Detection is indicated only via the Parallel Set Detection Icon. Technically, a sub-state of IDLE. |
| IDLE | | The phone is on-hook, no Parallel Set is detected and the user is not using the ON-HOOK DIALING feature. |
| MODEM DIALING | "Dialing ISP . . ." | The line has been taken off-hook and the modem is dialing. |
| MODEM BUSY | "ISP busy" | The line is busy. |
| MODEM REDIAL | "Redial. Attempt: N" | The modem is attempting the call again. |
| MODEM WAITING | "Waiting to connect . . ." | The modem has finished dialing and is waiting for modem tones. |
| MODEM CONNECTING | "Connecting . . ." | Modem tones are detected and the modem is negotiating with the far-end. |
| MODEM CONNECTED | "Connected to ISP" | Negotiation is completed. |
| MODEM DISCONNECTING | "Disconnecting . . ." | The modem is hanging up. |
| CHECKING EMAIL | "Checking email . . ." | An email application is checking for email. |
| SENDING EMAIL | "Sending email . . ." | The email application is sending email. |
| RECEIVING EMAIL | "Verifying password" | A password is being authenticated. |

2.2.3 Duration of Connection Field

The duration of connection field (906) displays the total contiguous time a line has been non-IDLE.

If the Line State is IDLE and Parallel Set Detection is FALSE, then the duration of connection field display is left blank.

If the line state transitions from IDLE to any state (except CHECK LINE), then the call duration begins counting. The duration of connection of outgoing voice calls is dependent on the device's ability to detect an "off-hook" state in the far-end device. For modem connections, far-end off-hook can be detected and the call duration will be accurate.

If the line state transitions from any state to IDLE, then the following events occur:

Duration of connection field stops counting;

The duration of connection field is displayed in this 'stopped' state for a pre-determined time (e.g., 5 seconds) OR until another event occurs which requires the duration of connection field to begin counting;

Once the pre-determined time (e.g., 5 seconds) has elapsed, the duration of connection displays no text.

2.2.4 General Information Field

The general information field (908, FIG. 9) is located in the summary status pane, directly under the line status field (904).

The general information field is used to display caller information. Because caller information is so important to the user, if the call slip is extended, then this information is not displayed in the general information field. Instead it is displayed in a much larger point size in the large call information field (located in the call information pane (see FIG. 10, for example)). Furthermore, because duplicated information is visual noise, if the information is indeed displayed in the large information field, it is NOT displayed in the general information field.

The types of messages displayed in the general information field depend on the application currently in control of the telephone line. If the line state is IDLE, IN USE or CHECK LINE, then the general information field is blank regardless of whether the call slip is extended or collapsed.

For interactive voice calls, the general information field is blank when the call slip is extended. If the call slip is collapsed and the line state is NOT IDLE, IN USE or CHECK LINE, then the general information field displays the text that is stored in the large call information field as described further below.

An exception to the previous two cases is as follows. If the line state is CONNECTED and the user requests the generation of DTMF signals via either the Keypad or an automated dial button, then the general information field displays the digits dialed for a pre-determined time duration (e.g., 10 seconds) OR until another event occurs which uses the general information field. If another DTMF is dialed before the timer has elapsed, then the 10 second timer begins counting anew. These 'post-connection' digits are not appended to the phone number displayed in the call information pane nor are they included in the phone number should the user decide to add the number to the contact database. The purpose of this feature is to display the digits the user has dialed without creating a confusing heap of useless information for the user. It is assumed that numbers dialed after a connection is achieved need to be displayed only temporarily. For example, the user may enter their credit card information. The user will want to be sure they have dialed the correct string, but the user will not want this information displayed permanently, nor will the user want to add this to the contact database should he decide to create a database entry.

For the calls handled by the answering machine application, the general information field contains caller information when the call slip is collapsed. The caller ID text is stored in a field called the large CID field, which is explained further below.

For calls handled by the modem application, the general information field contains the text that is stored in the Large CID Field when the call slip is collapsed.

2.2.5 Parallel Set Detection Bitmap

The parallel set detection icon (910) is displayed to indicate that a parallel set has been detected. It is visible when the device detects a parallel set.

2.3 Call Information Pane

Figure 10:
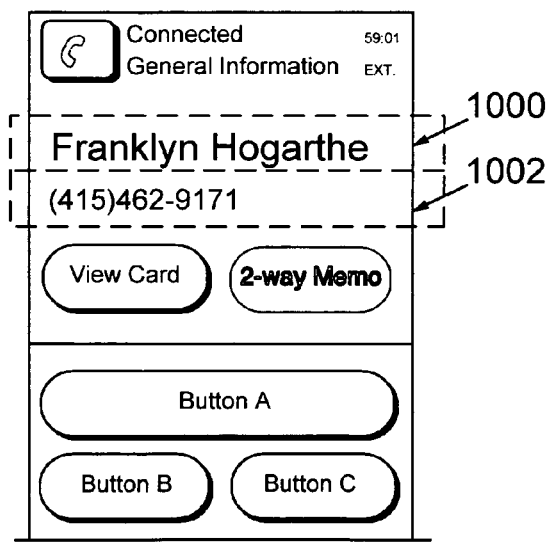
FIG. 10 shows an example of fields in a call information pane of a call slip UI element.

The call information pane is used to display the called party information produced by an outgoing call or the Caller ID received on an incoming call or Caller ID on Call Waiting. FIG. 10 highlights the fields in the call information pane.

As shown in FIG. 10, the call information pane is composed of the following elements:
- a large call information field (1000), and
- a small call information field (1002).

2.3.1 Large and Small Call Information Fields

The large call information field displays information deemed to be the most important for a telephone call. Unfortunately, the information that is 'known' about any particular call varies depending upon the availability of Caller ID (for incoming calls) and Contacts information (for outgoing calls). For example, the name of a caller is almost always more important to the user than the phone number. Therefore, if name information can be culled from the Caller ID number or Contact database, then the name is displayed in the large information field. If no name can be derived and a telephone number is available, then the phone number becomes the most important piece of information available, and it is displayed in the large call information field.

The small information field is another portion of the call information pane used to display information obtained from Caller ID or the contact database. The information is deemed to be of lesser importance than that displayed in the large call information field. As such, it is displayed using a smaller font. The separation of the call information into two fields reflects a specific design choice. Call information can be formatted for display in a variety of ways, using one or more fields with the call slip.

Caller ID information is delivered to the near-end device during the first and second ring. Caller ID consists of two fundamental types of information: CND and CNAM. CND stands for caller number delivery and is the telephone number of the calling party. CND, when successfully delivered, contains one of the following: the caller's 10-digit phone number (area code, prefix, number), 'private number' or 'unavailable number'. A caller who is blocking the delivery of their number produces 'Private number'. A caller who is calling from a location that the Telco cannot find a number for (or is unwilling to transmit) produces 'Unavailable number'.

CNAM stands for caller name delivery and is the name associated with the Telco account holder of the far-end party's phone line. CNAM, when successfully delivered, contains one of the following: the account holder's name, "Private Name" or 'unavailable name'.

2.3.4 Call Information Display

Figure 11:
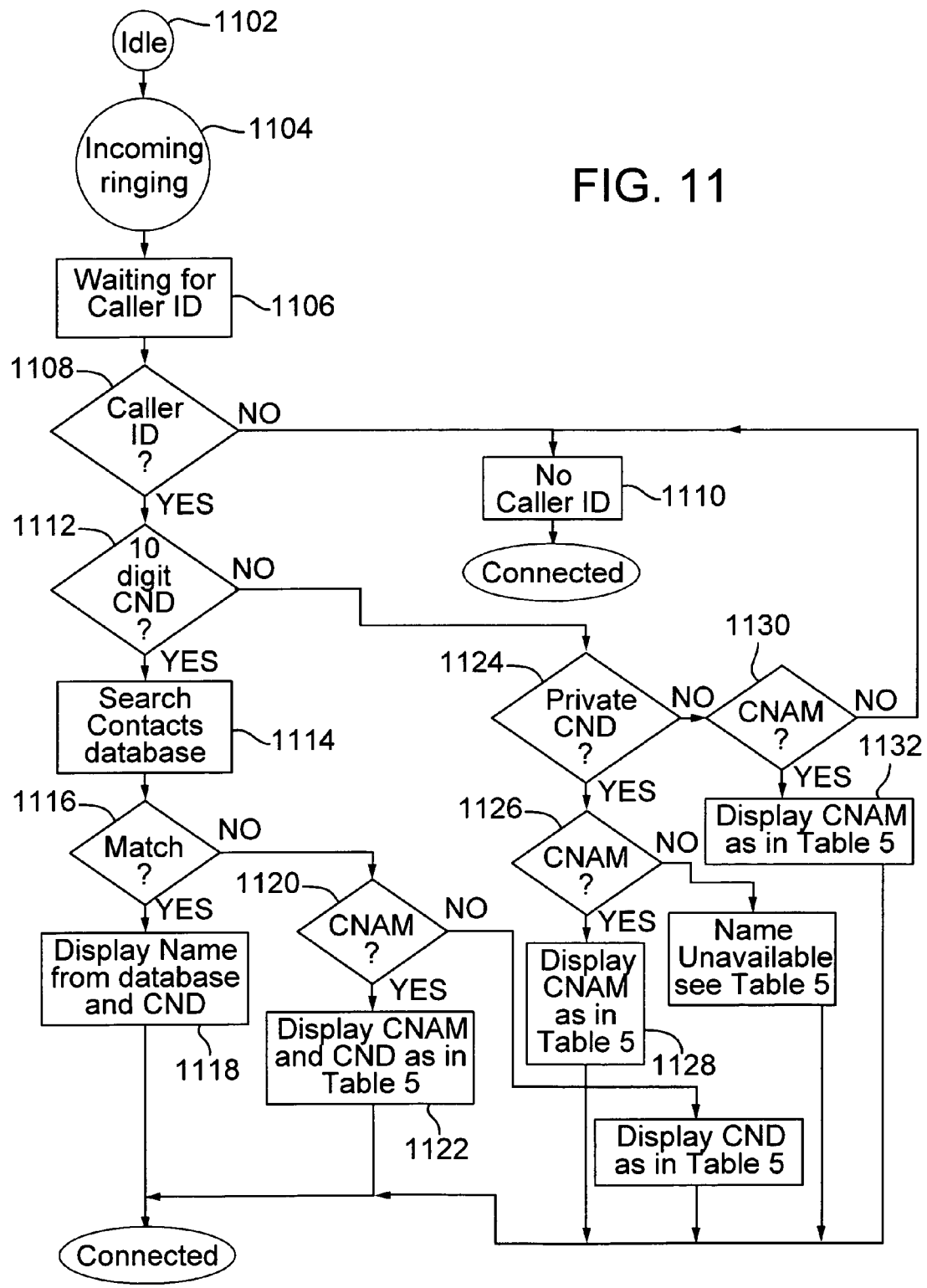
FIG. 11 is a flow diagram illustrating how the call information field of a call slip displays caller ID information.

The call information fields can display information derived from the Caller ID, the contact database, or a combination of both. FIG. 11 is a flow diagram illustrating the operation of an implementation of the call information display. For incoming calls, the process of displaying caller information begins when the line state transitions from idle (1102) to incoming ringing (1104). In response to this state transition, the call information pane displays "waiting for Caller ID" (1106). The caller information remains in this state until either Caller ID is received and a contact database search has been performed, or the line state becomes connected.

The call slip displays caller ID information from the line or caller information from the contact database as explained below. If Caller ID information is not received by the end of the second ring (1108), then the call information field displays "no Caller ID" (1110).

If 10-digit CND information is received (1112), then the search of the contact database for a matching phone number commences (1114). The search compares the CND number to phone number fields in the contact database for all contacts in the database. If a match is found (1116), then the call information fields display the name from the contact database and the phone number for the Caller ID information (1118).

If no match is found and the CNAM data is available (1120), then the call information field displays the phone number and the message about the CNAM information that is provided (1122). Table 5 below provides some examples of types of messages displayed based on the nature of the CNAM information received.

If "private number" CND information is received (1124), the call information field indicates that the caller has a private number. The display of caller name information in this context depends on the nature of the CNAM information received. For example, if CNAM data is available (1126), then the call information field displays the CNAM data as described below in Table 5 (1128).

If CND information is unavailable, then the call information field indicates that the number is unavailable, for example, by displaying the text, "number unavailable." In the event that CND information is not available but CNAM information is available (1130), then the call information field displays an indicator reflecting the nature of the CNAM information that is available as set forth in Table 5 (1132). Finally, if neither CND nor CNAM information is available, the call information field displays "no Caller ID" (1110).

While the implementation illustrated in FIG. 11 does not initiate a search of the contact database based on CNAM information, such a search could be conducted in an alternative implementation. For example, the call slip could be programmed to initiate a search through the contact database for a matching name, and fill in the caller information field with a phone number from the contact database if the CND information were unavailable.

Table 5 provides an example of how the call information field may be organized depending upon the type of information received from Caller ID. Caller ID may deliver either CND or CNAM, or it may deliver both.

TABLE 5

| SCENARIO | CALL SLIP DISPLAY | | EXAMPLE |
|---|---|---|---|
| Private/Blocked | Name = | Unknown caller | |
| | Number = | Private number | |
| Out of Area | Name = | Unknown caller | |
| | Number = | Out of area | |
| Unavailable | Name = | Unknown caller | |
| | Number = | No Caller ID | |
| CNAM received | Name = | CNAM | Justin Cooper |
| CND received | Number = | CND | 6504629171 |
| CNAM received | Name = | CMA | Justin Cooper |
| No CND received | Number = | Number unavailable | Number unavailable |
| CND received | Name = | CND | 6504629171 |
| No CNAM received | Number = | Unknown caller | Unknown caller |
| No CNAM received | Name = | Unknown caller | |
| No CND received | Number = | Number unavailable | |

If no name is received, but a number is received, then the number and name fields are reversed. If a match for the caller is found in the address book, then the caller name and number are displayed as if they were received through caller ID.

The scenarios in the left-hand column of Table 5 are defined below.

Private/Blocked: Party identifier information is not available because it has been blocked by the remote party.

Out of area: Caller ID information for the call is not available because it has not propagated all the way by the network.

Unavailable: Party identifier information is not available and will not become available later. Information may be unavailable for unspecified reasons, such as the information was not delivered by the network, it was ignored by the service provider, and so forth.

CND: Party identifier information consists of the party's address in either canonical address format or dialable address format.

CNAM: Party identifier information consists of the party's name (as for example, from a directory kept inside the switch.)

Partial: Party identifier information is valid, but is limited to partial information only.

Unknown: Party identifier information is currently unknown, but may become known later.

2.4 Call Slip Control Pane

Call slip control panes provide the opportunity to customize the call slip by adding graphical user interface controls. Call slip control panes may be used for any purpose, although it is assumed that, at a minimum, some call disposition controls will be included. The call slip control panes are cognizant of certain changes to the phone state and to the receipt of particular data (such as Caller ID information) and may be modified dynamically in response to these events. For example, the default call slip control pane (see below) displays a 'Take a message' button only when it is appropriate to do so (i.e. the call has not yet been answered and the answering machine is ready). Multiple call slip control panes can be added Furthermore, the vertical positions of all call slip panes within the call slip are customizable.

2.4.1 Default Call Slip Control Pane

The software platform includes a default call slip control pane with pre-configured behavior. These buttons provide advanced control of the device. The default call slip control pane, like the call information pane, is removable. The default call slip control pane provides the following features via user interface controls:

Send a call directly to the Answering Machine;

Dial the most recent call (incoming or outgoing);

Add the most recent caller to the contact database; and

Edit the most recent caller's contact information if the caller is already in the contact database.

3.0 Software Platform Architecture

As noted above, the software platform includes a number of software modules for managing telephony functions. Referred to as the application-level telephony software, these modules manage access to the telephone line, send and receive information via the line, and communicate telephone line information to the call slip interface.

Before outlining the telephony application software, it is helpful to begin with a picture of the entire software architecture.

3.1 Application Level Architecture

Figure 12:
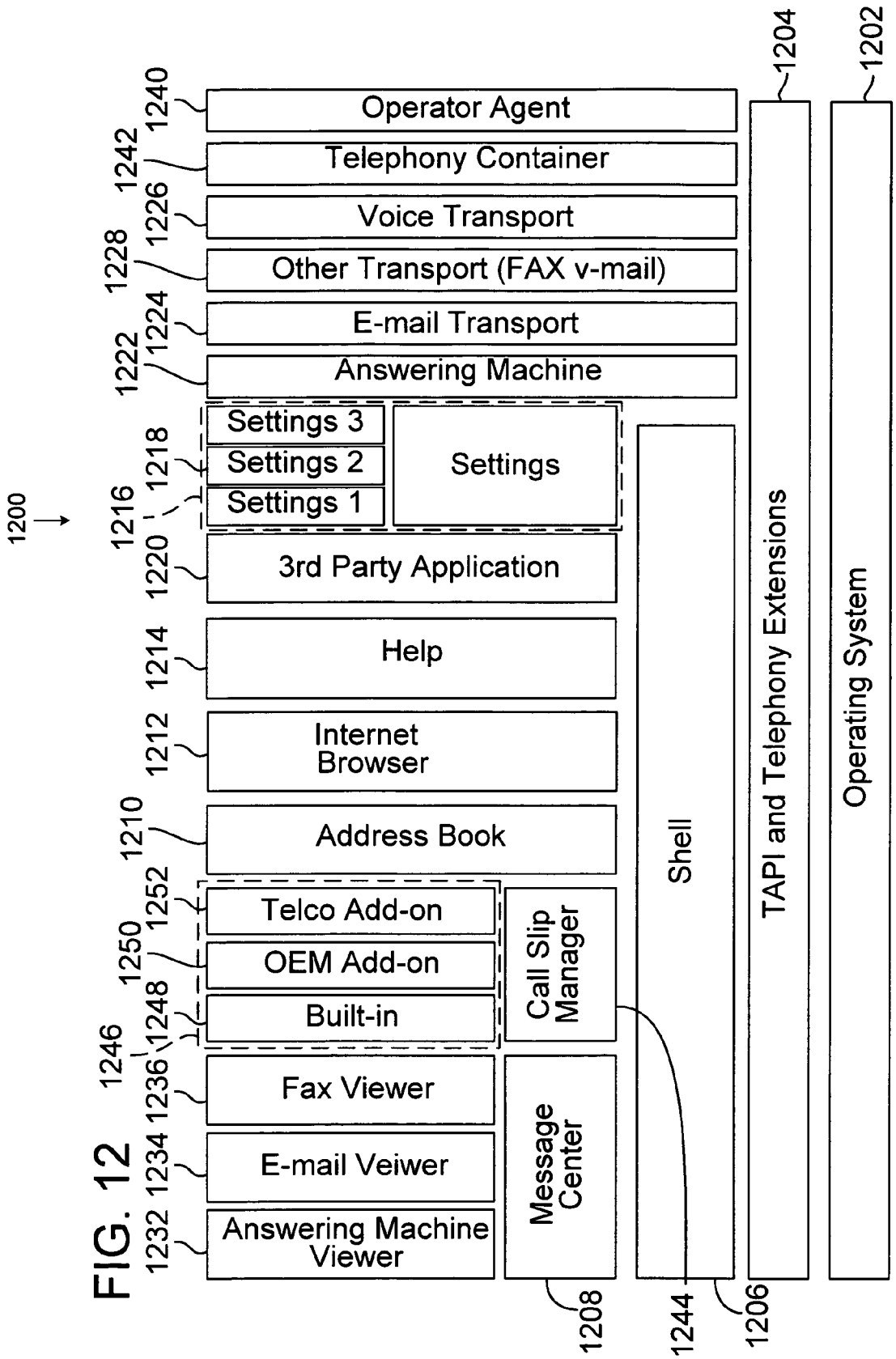
FIG. 12 is a block diagram illustrating the software architecture of a software platform including support for call slip UI elements.

FIG. 12 illustrates the architecture (1200) of the current implementation. The application software executes on the Windows® CE operating system (operating system (1202)) and uses a subset of the Telephony Application Programming Interface (TAPI) (1204) from Microsoft Corporation to perform basic telephony tasks such as causing the phone to ring or generating a DTMF tone. The version of TAPI in this system supports incoming and outgoing voice calls, data modem calls and fax.

The shell (1206) provides the framework of the graphical user interface. Though not specifically shown, applications can make direct access to the API of the operating system. In addition, applications can access services that the shell provides, such as an event scheduling service. The shell replaces the shell of the Windows® CE operating system, and it cooperates with application programs to provide a consistent user interface.

The application programs include telephony components (described more fully below), the message center (1208), address book (i.e. a software component for accessing the contact database) (1210), web browser (1212), help system (1214), and an application (1216) for modifying settings (1218). The implementer may incorporate custom application programs (e.g., $3^{rd}$ party application (1220) into the software platform). These applications may invoke platform services through the APIs of the shell (1206), TAPI and telephony extensions (1204), and the operating system (1202).

The message center (1208) provides integrated access to all types of messages that the user can receive through the host device, such as answering machine messages, e-mails, and faxes. For each type of message, the message canter relies on a pair of components: a message transport and a message viewer. Examples of the message transport include answering machine transport (1222), e-mail transport (1224), voice transport (1226), fax transport and voice-mail transport (1228). The message transport executes in the background, independent of the shell (1206). It receives messages of a particular type and saves them to persistent storage. The message viewer plugs into the message center (which in turn plugs into the shell (1206), as shown in FIG. 12), and provides the functionality for displaying and managing messages of a particular type. Examples of the message viewers include an answering machine viewer (1232), an e-mail viewer (1234), and fax viewer (1236).

The Address Book application (1210) allows users to create, view, and manage a collection of "address cards," each of which contains information such as a name, address, phone numbers, and e-mail address. The persistent storage mechanism for the Address Book is the contact database in the Windows CE operating system.

The software platform includes a number of software modules for managing telephony functions. Referred to as the application level telephony software, these modules manage access to the telephone line, send and receive information via the line, and communicate telephone line information to a software module that manages the call slip UI element called the call slip manager.

The application-level telephony modules include an operator agent program (1240), telephone monitoring application (TMA) programs (1242), the transports (1222–1228), a call slip manager (1244), and call slip programs (1246). Some call slip software components are provided with the software platform (e.g., built-in or "default" call slip objects (1248)). The call slip manager provides an API and software architecture framework that enables an implementer, such as an Original Equipment Manufacturer (OEM) or telephone company (Telco) to incorporate new call slip components into the platform (e.g., OEM Add-on (1250), Telco Add-on (1252), etc.).

3.2 Overview of Telephony Application Architecture

Figure 13:
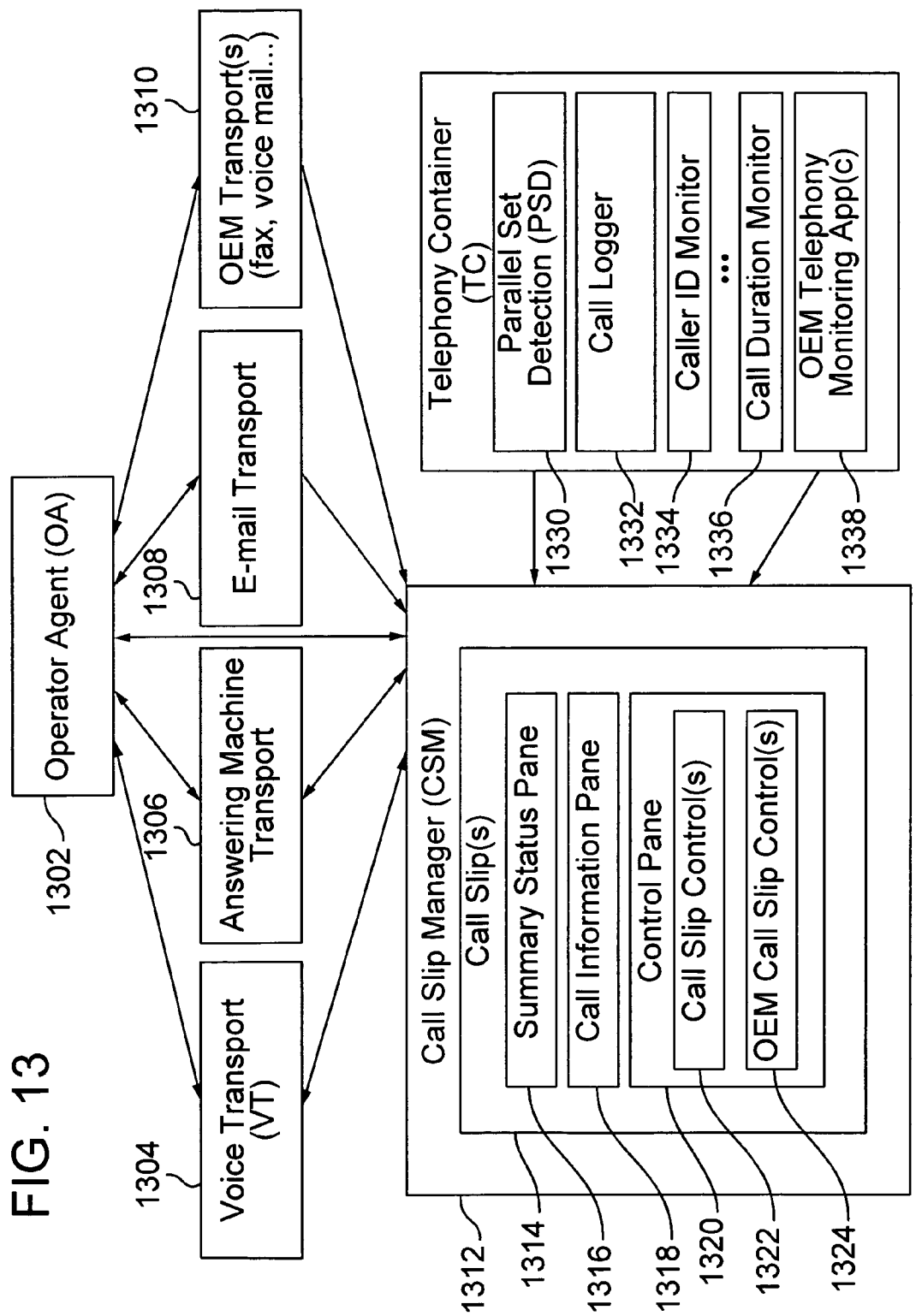
FIG. 13 is a block diagram illustrating application level telephony components of the platform shown in FIG. 12.

Having provided an overview of the entire system, we can now focus on the implementation of the telephony components. FIG. 13 is a block diagram illustrating these components in more detail. The operator agent (1302) is a code module responsible for determining the media mode of an incoming call and handing the call off to the appropriate transport.

The operator agent is implemented as a Protected Service Library (PSL). A PSL shares traits of a dynamic link library in that it exposes a programming interface, yet unlike a DLL, it is a separate, executable program that runs in its own address space. A PSL helps prevent data corruption because it does not allow client applications to access its address space.

The transports (1304, 1306, 1308, 1310) are responsible for sending and receiving calls of a particular media mode. Some, but not all, of the message transports are telephony applications (that is, they are clients of TAPI). The e-mail transport (1308) is not a client of TAPI, but the voice (1304) and the answering machine transports (1306) are clients of TAPI. The e-mail transport (1308) can both send and receive, while the answering machine transport (1306) can only receive.

Those message transports that are telephony applications are marked in the registry as being potential targets of calls handed off from the operator agent (1302). Each such telephony message transport is marked in the registry with the media modes it is willing to handle.

The voice transport (1304) plays the role of the message transport for interactive voice calls. It is the application to which the operator agent (1302) hands off an incoming call when a human answers, and it is the application responsible for creating and managing an outgoing voice call.

The call slip manager (CSM (1312)) provides the user interface to telephony applications. The call slips (1314) are software objects whose functions and data are accessible via a programming interface. In particular, the call slip objects are implemented as in-process COM servers within the CSM process. To enable other processes to communicate with the call slips, the CSM exposes an API via the PSL mechanism.

Each pane within a call slip window is implemented as an in-process COM server in the CSM process. The user interface controls (e.g., buttons, list boxes, check boxes, etc.) are also COM objects and are implemented as window controls in their respective panes.

FIG. 13 illustrates the relationship among the call slip object, and related pane objects. For example, the summary status, call information and control panes (1316, 1318, and 1320) are objects encapsulated within the call slip object. Default call slip controls (1322) and implementer supplied call slip controls (e.g., OEM call slip controls (1324)) are child windows of this host pane, namely the control pane (1320).

The telephony architecture divides call logging and line in/out-of-service monitoring functions into separate TAPI client applications, each of which has a monitor privilege on the phone or the lines. These applications are referred to as telephony monitoring applications (TMAs). Examples of the TMAs include a Parallel Set Detection (PSD) TMA (1330), a call logger (1332), a caller ID monitor (1334), and a call duration monitor (1336). The implementer may also supply other TMAs (1338).

A TMA can expose a user interface by communicating with the CSM (the line in/out-of-service application does this). It can also write information to a database (the call logger does this).

The advantage of having a separate application for each monitoring function is that it allows an implementer to add an additional monitoring function without modifying a complicated, monolithic TAPI application. For instance, an implementer could write a TMA to listen for metering pulses (special signals used for billing purposes on European telephone networks).

The process that houses the TMAs is the Telephony Container (TC). TC is launched automatically during system boot. When a TMA detects an event that it is monitoring, it invokes a function in the CSM programming interface to communicate the event to the CSM.

3.3 Message Transports

The message transports each have a programming interface. Other program modules may access the services of a transport programmatically by invoking its functions. In addition, a transport communicates with other program modules by issuing events to other modules registered to receive these events.

In the current implementation, the voice transport is a PSL. It exposes an API that allows an application such as an on-screen dialer to perform call control. The API includes such functions as VtMakeCall(int iLine, LPCTSTR psznumber) and VtDropCall(int iLine, void*pvReserved). The first function instructs the voice transport to take the phone off-hook, and to initiate an interactive voice call on the specified line (iLine) by dialing the specified digits (pszNumber). The second function instructs the voice transport to terminate the call on the specified line.

The other transports may be implemented to expose their functions in a similar fashion.

3.4 Call Slip Manager

The Call Slip Manager (CSM) provides the user interface for telephony applications. It makes the call slips accessible to other programs via a series of programming interfaces.

3.4.1 The ICallSlip Interface

Each call slip object is implemented as an in-process COM server (in the CSM process) that exposes the programming interface ICallSlip. The ICallSlip interface has a number of functions (called methods), including Extend and Collapse, which slide the call slip up and down. Other methods of ICallSlip respond to telephony events; for instance a function named OnIncomingCall is called when an incoming call arrives. Functions like OnIncomingCall enable the TMAs in the telephony container to communicate changes in line state and line information, such as Caller ID information, to the call slip.

3.4.2 Call Slip Panes

Each call slip is divided visually and logically into a collection of call slip panes. A system implementer can customize the call slips by;

- Adding additional call slip controls (pushbuttons or any other control type) to the control pane. These would typically be used to provide a user interface to advanced telephony features, but they can be used for anything.
- Creating one or more additional control panes, and populating them with new call slip controls.
- Rearranging the vertical ordering of the panes.
- Omitting the call information pane.

3.4.2.1 Pane Interfaces

Each pane is implemented as an in-process COM server (in the CSM process) that exposes the interface ICallSlipPane. Each specific type of pane exposes an additional interface. The summary status pane exposes a programming interface called the ICallSlipSummaryStatusPane, the call information pane exposes ICallSlipCallInformationPane, and control panes expose ICallSlipControlPane.

This architecture allows a system implementer to customize the appearance of the standard panes. It also allows a system implementer to build a Call Slip UI without panes at all. The behavioral repertoire of panes could be extended by allowing them to expose additional programming interfaces (e.g., ICallSlipCallInformationPane2).

Each call slip pane receives an ICallSlip interface pointer to the call slip that contains it. This allows the call slip to offer certain services, such as phone number formatting and Caller ID tracking, to any pane that wants to make use of them. For instance, the call slip provides functions such as ICallSlip::GetCanonicalDialedDigits and ICallSlip::GetLastCallerID to get the dialed phone number in canonical format and to get the Caller ID information of the last caller, respectively.

3.4.2.2 Registry Information For Call Slip Panes

The description of each pane is stored in the registry, so panes can be added and removed by a system implementer without changing the code of the CSM. The registry format is as follows:

```
HKEY_LOCAL_MACHINE\HALTA\CSM\Panes\
    0\
        @="{00000000-0000-0000-0000-000000000000}" //
Summary Status Pane
    1\
        @="{11111111-1111-1111-1111-111111111111}" // Call
Information Pane
    2\
        @="{22222222-2222-2222-2222-222222222222}" //
Standard Control Pane
    3\
        @="{33333333-3333-3333-3333-333333333333}" // OEM
Control Pane (optional)
```

Each key under HALTA\CSM\Panes represents a pane. The name of the key gives the vertical ordering of the pane within the Call Slip (0 is topmost). The default value of the key is the CLSID of the COM object that implements the pane. COM uses the CLSID to locate the DLL server for the component. It is possible to have the same DLL serve more than one pane. A system implementer with more than one custom control pane might choose to group them into a single DLL to save memory.

3.4.3 Control Panes

The default control pane contains a collection of buttons. These buttons are enabled and disabled, shown and hidden under various conditions. When they are clicked, they initiate some action. A control pane can contain any type of control.

One important decision in the design of the control pane is who is responsible for the behavior of the controls. That is, who decides when a control is enabled or disabled, when it is shown or hidden, and what action it performs when clicked? From the highest to the lowest level, these decisions could be made by the clients of the CSM (the telephony applications), by the CSM itself, by the call slip, by the control pane, or by the controls themselves. In the current implementation, the controls are responsible for their own behavior. That way, as the product evolves, controls can be added or removed without affecting the logic of the control pane or any higher-level software component.

This design also makes it possible for a system implementer to customize the control pane by adding controls. Since the controls encapsulate their own behavior, the logic of the control pane need not change when a system implementer adds a control.

Each control in the control pane is implemented as an in-process COM server exposing the interface ICallSlipControl. This interface has methods such as OnIncomingCall, OnDisconnect, etc., which mirror the methods of the ICallSlip and ICallSlipPane interfaces.

When a telephony application detects an event of interest, it notifies the CSM via one of the CsmOnEvent API functions. The CSM forwards the event to the call slip for the appropriate line via ICallSlip::OnEvent, which in turn forwards it to each pane via ICallSlipPane::OnEvent. The control pane's implementation of ICallSlipPane::OnEvent iterates over the controls in the pane, calling ICallSlipControl::OnEvent on each in turn.

Each control implements the various ICallSlipControl:: OnEvent methods. In any of these methods, the control can choose to enable, disable, show, or hide itself, or even change its caption. For instance, the "Add contact" button responds to the OnIncomingCall event by showing and enabling itself.

A Windows control reacts to user input events by sending Windows messages to its parent window. For instance, when a user taps a button, the button sends WM_COMMAND (BN_CLICKED) to its parent. When a user types a character into an edit control, the edit control sends WM_COMMAND(EN_UPDATE) and WM_COMMAND(EN_CHANGE) to its parent. Newer Win32 controls send WM_NOTIFY, rather than WM_COMMAND, to their parents.

Call slip control panes reflect WM_COMMAND and WM_NOTIFY messages back to the originating control. Each call slip control is designed to react to these reflected Windows messages (for instance, by adding the appropriate entry to its message map, or adding a case to its window procedure). This means that each call slip control is implemented by subclassing the appropriate Windows control.

3.4.3.1 Registry information

The description of each control is stored in the registry, so controls can be added and removed by the system implementer without changing the code of the control pane. The registry format is as follows:

```
HKEY_LOCAL_MACHINE\HALTA\CSM\CTL\2\
    {55555555-5555-5555-5555-555555555555} // "Add
contact" button
            row        1
            col        1/1
    {66666666-6666-6666-6666-666666666666} // "Edit
contact" button
            row        1
            col        1/2
    {77777777-7777-7777-7777-777777777777} // "Dial"
button
            row        1
            col        2/2
    {88888888-8888-8888-8888-888888888888} // "Take
message" button
            row        1
            col        1/2
```

Each key under HALTA\CSM\CTL represents a control pane. The name of the key (in the example above, "2") is the pane number as found under [HKEY_LOCAL_MACHINE]\HALTA\CSM\Panes. Each key under the pane identifier represents a control to be displayed in that pane. The name of the key is the CLSID of the COM object that implements the control. COM uses the CLSID to locate the DLL server for the control. It is perfectly possible to have the same DLL serve more than one control. A system implementer with more than one extra control might choose to group them into a single DLL to save memory.

The named value "row" is the 1-based row number on which the control is displayed. Rows 1 and 2 are reserved for standard call slip controls. Rows 3 and up are available to a system implementer.

The named value "col" is the column number. A value "1/1" ("1 of 1") says that there is only one control in the row, and it occupies the full width of the call slip (with some space left for a border). "1/2" ("1 of 2") means that there are two controls, each approximately half the width of the call slip, and that this is the first, or leftmost, of the two. Standard call slip controls are either full-width or half-width, but a system implementer could choose to put three narrow controls in a row, with "col" values of "1/3", "2/3", and "3/3".

The registry information does not include the control's text. For one thing, the control's text might change during normal operation. The text is in the string table of the resource file for the DLL that serves the control object. When the control's Init method is called, it extracts the text from the resource file before creating the control's window.

3.4.4 The PSL Interface

In the current implementation, the call slips are in-process servers within the CSM process; therefore the other processes in FIG. 12, such as the message transports, cannot obtain interface pointers to them. Yet we must provide a mechanism for these processes to communicate with the call slips. Therefore the CSM exposes an API via the PSL mechanism. We can consider this API the logical equivalent of a "ICallSlipManager" interface.

In the default implementation, most functions in this API simply delegate to a method in ICallSlip (which in turn frequently delegates to a method in ICallSlipPane). For instance, the API function CsmOnIncomingCall(int iLine) looks up the ICallSlip interface pointer for line iLine, and calls ICallSlip::OnIncomingCall through that pointer. This method in turn iterates over each pane in the call slip, invoking ICallSlipPane::OnIncomingCall on each in turn. Each pane responds appropriately. For instance, in the default implementation, the summary status pane implements OnIncomingCall by displaying the message "Incoming call . . . " in the line status field. The CSM's API is thus largely a union of the individual pane interfaces.

As noted above, there are also a few API functions for higher-level operations such as extending or collapsing the call slip as a whole.

This architecture allows a system implementer to provide a phone control UI that does not have call slips at all. A system implementer could choose to dedicate a large area of the home screen to the phone interface, and never hide or show it. That implementation of the CSM would implement the CSM API directly, without delegating to an underlying call slip and its panes. In this case, a system implementer would implement the CsmExtendCallSlip and CsmCollapseCallSlip functions as no-ops.

3.4.5 Interface design goals

So far we have enumerated components (the CSM, call slips, and call slip panes) and named their interfaces (ICallSlipPane, etc.).

In creating the current implementation, we followed a set of design goals, which are listed below. These design goals represent guidelines for our implementations but they are not necessarily required to implement the invention.

One design goal is to hide the details of the call slip user interface behavior from the clients that utilize this interface, such as the operator agent.

To accomplish this goal, the CSM API offers a set of functions named CsmOnEvent, which inform that CSM that events of interest to it have occurred. The CSM can implement whatever UI behavior it wishes in response to those events. So for instance, when a call comes in, the operator agent—a client of the CSM—calls CsmOnIncomingCall, and the CSM takes care of the UI behavior for responding to that event.

The intention of the telephony application architecture is that standard telephony components use the CsmOnEvent APIs exclusively. System implementers should also use these APIs as much as possible, to minimize the coupling of UI behavior into other components of the system, but can use the lower-level CSM API functions if there is no appropriate CsmOnEvent function.

Another design objective in the current implementation is to avoid duplication of telephony logic between the CSM and its clients. In principle, the CSM could on its own detect all the telephony events it requires by being a TAPI monitor application. Then there would be no need for other telephony components such as the operator agent to inform the CSM of interesting events, and there would be no need for the CsmOnEvent API functions.

But those other telephony components—the operator agent, voice transport, caller ID monitor application, etc.—already have logic to detect these events. Therefore rather than duplicate this logic in the CSM, the other telephony monitoring applications inform the CSM of these events through the CSM API.

This couples the telephony apps to the CSM in the sense that 1) they know which events are of interest to the CSM, and 2) they link with the CSM's thunking library. We consider this coupling to be minimal, and an acceptable price for avoiding code duplication. This code duplication would itself have been a form of coupling (changes made in one place would have to be duplicated in the other).

Another design objective is to allow for customization by system implementers. The software platform provides CSM API functions such as CsmOnIncomingCall, CsmOnDisconnect, etc., to respond to certain telephony events. But an implementer might want the CSM to respond to events other than those for which the platform provides an API function.

For these situations, the CSM API includes functions for explicitly manipulating the call slip (CsmCollapseCallSlip, CsmExtendCallSlip), and for displaying information in the call slip (CsmDisplayStatus, CsmDisplayInformation, etc.). When a custom telephony application added by a system implementer detects a condition that should be reflected in the UI, it can call these lower level API functions to obtain the desired effects.

Yet another design objective is to hide CSM UI details from its clients. The location and format of information within the UI may be hidden from other telephony components. For instance, depending on circumstances, the CID number might be displayed in the general information field of the summary status pane, or in either the large or small call information field of the call information pane. The specific display format of the line state and call information is hidden from the monitoring programs by exposing general interface functions to them in the CSM programming interface. The CSM API has functions like CsmOnCallerID rather than functions such as "CsmSetSmallCallInformationField". The internal components of the CSM decide what to do with the information provided in these function calls.

3.4.6 Response of the Call Slip to Windows Messages

In the current implementation, there are two circumstances when the default behavior of the Call Slips is modified, The first is during a backup or restore. When the contact database is being backed up or restored, the "Add contact" and "Edit contact" buttons in the control pane should be unavailable. A system implementer's control might have a similar restriction. Therefore the window procedure for each control is implemented to detect specific Windows message WM_BACKUPRESTORE and respond to it by invoking the control's implementation of the method ICallSlipControl::OnBackupRestore( ), A control can choose to implement this method as a no-op if its operation is not affected by backup/restore operations.

The second circumstance that modifies the call slip behavior is when an application is remaining full screen. In this case, the Call Slip is completely invisible in its collapsed state (but it still expands automatically in certain circumstances). Therefore the window procedure for the call slips detects the Windows message WM_FULLSCREEN and responds to it by invoking the call slip's implementation of the method ICallSlip::OnFullScreen( ). The default implementation of this method causes the call slip to become completely invisible whenever its ICallSlip::Collapse( ) method is invoked. A system implementer could change this behavior.

3.5 Telephony Monitoring Applications

The telephony architecture divides call logging and line in/out-of-service monitoring functions into separate TAPI client applications, each of which has monitor privilege on the phone or the lines. These applications are referred to as Telephony Monitoring Applications (TMAs).

A TMA can expose a user interface by communicating with the CSM (the line in/out-of-service application does this). It can also write information to a database (the call logger does this).

The advantage to having a separate application for each monitoring function is that it allows an implementer to add an additional monitoring function without modifying a complicated, monolithic TAPI application. For instance, an implementer could write a TMA to listen for metering pulses (special signals used for billing purposes on European telephone networks).

The drawback to implementing TMAs as separate applications is that Windows® CE is limited to 32 processes. To conserve process slots, we choose instead to implement each TMA as an in-process COM server exposing ITelephonyMonitorApp. This architecture allows an implementation to provide additional monitoring functionality.

3.5.1 The Telephony Container Application

The process that houses the TMAs is the Telephony Container (TC). When TC starts, it calls TAPI functions lineInitializeEx and phoneInitialize. It calls TAPI functions lineOpen (on each line) and phoneOpen. TC then reads the list of TMAs from the registry. For each TMA, TC calls COM function CoCreateInstance to create an instance of the TMA, and then calls ITelephonyMonitorApp::Init, passing the phone handle and line handles to the TMA.

The TC's phoneCallback function forwards each phone message it receives to each TMA by calling ITelephonyMonitorApp::PhoneCallback; likewise, its lineCallback function forwards line messages to the TMAs by calling ITelephonyMonitorApp::LineCallback. A TMA that it is not interested in phone or line messages can implement the corresponding callback method as a no-op that simply returns S_OK. Of course, the TMA must implement at least one of the callback methods, or there would be no point to its existence.

As an alternative implementation, each TMA could register separately with TAPI, receiving its own TAPI instance handle and registering its own phoneCallback and lineCallback functions. The disadvantage of this approach is that TAPI would have had to deliver every message to each TMA; each such message delivery would involve a process switch. The chosen design runs faster, and at the same time simplifies the TMAs because they do not have to call lineInitializeEx, lineOpen, phoneInitialize, or phoneOpen.

3.5.2 Registry Information

The description of each TMA is stored in the registry, so TMAs can be added and removed by the system implementer without changing the code of the TC. The registry format is as follows:

---

HKEY_LOCAL_MACHINE\HALTA\TC\TMA
    {aaaaaaaa-aaaa-aaaa-aaaa-aaaaaaaaaaaa} // Line
in/out-of-service Monitor
        {bbbbbbbb-bbbb-bbbb-bbbb-bbbbbbbbbbbb} // Call Logger

---

Each key under HALTA\TC\TMA represents a TMA. The name of the key is the class identification (CLSID) of the COM object that implements the TMA. COM uses the CLSID to locate the DLL server for the TMA. It is perfectly possible to have the same DLL serve more than one TMA. A system implementer with more than one extra TMA might choose to group them into a single DLL to save memory.

3.5.3 Phone Ownership

In TAPI, the term "phone" refers to the collection of lamps, buttons, microphones, speakers, and hookswitches that make up the physical phone set. Only one TAPI application can "own" the phone (by calling phoneOpen and specifying PHONEPRIVILEGE_OWNER for the dwPrivilege parameter, or by calling phoneSetPrivilege and specifying PHONEPRIVILEGE_OWNER). The software components of application-level telephony architecture (the OA, the VT, other transports, the CSM, or the TC) share ownership of the phone. The implementation of shared ownership enables each component to focus on its individual role and maintains symmetry among the transports. Moreover, it allows each component to access phone hardware at different times. The application-level telephony architecture specifies that when an application needs ownership of the phone, it calls phoneSetPrivilege requesting ownership privilege. If another application already owns the phone, the request will fail. Therefore an application should relinquish ownership of the phone as soon as possible by calling phoneSetPrivilege and requesting monitor privilege.

It is possible that there could be resource conflicts if the processing of calls on two different lines—for instance, a voice call on Line 1 and a data call on Line 2—both require ownership of the phone at the same time. This potential conflict can be avoided by retrying the phoneSetPrivilege call until it succeeds.

4.0 Hardware Implementation

Figure 14:
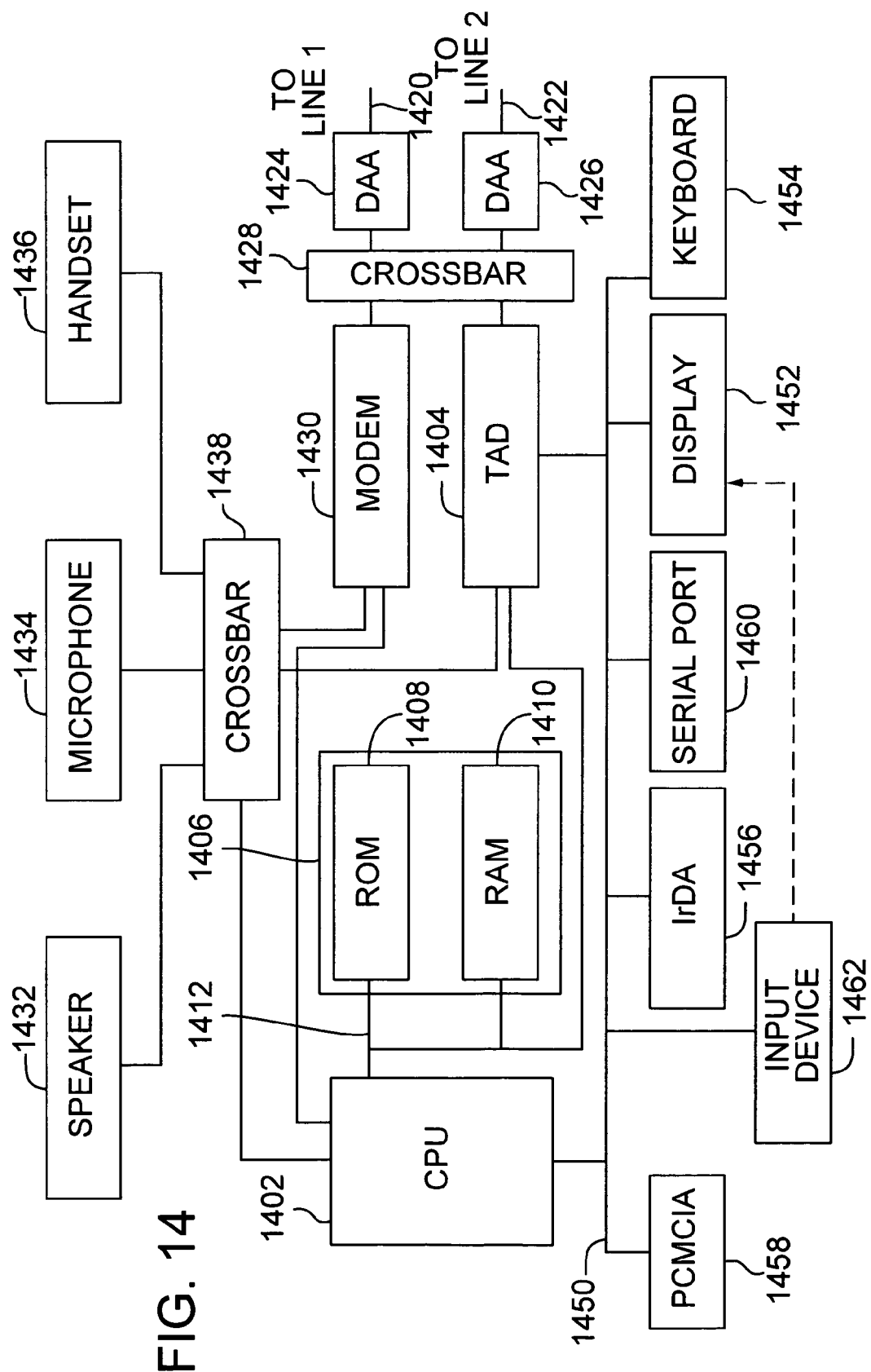
FIG. 14 is a block diagram illustrating a hardware implementation of a screen phone.

The software platform described above is designed to run on a variety of telephony device architectures. Some basic hardware elements are common to most implementations such as a processor (e.g., a CPU), a computer readable medium (e.g., RAM/ROM), a screen display, and an input device capable of selecting display elements on the screen display. FIG. 14 is a block diagram illustrating an overview of a hardware architecture for a web telephone. This FIGURE provides an example of hardware features, yet these features are not required in all implementations. The description of these features and an understanding of the software platform described above should make it clear that a variety of deviations from the hardware architecture are possible while still being capable of executing the software platform.

The processing resources of the telephony device may reside in one or more processor chips. Since the required processor performance varies depending on the demands of the processing functions of the device, the hardware implementation of the processing resources will vary as well. In the context of the web telephone discussed above, the processing functions include running the operating system and application programs and performing signal processing functions of the telephone, modem and fax machine. These functions may be carried out on a single host CPU or on a CPU in combination with a supporting Digital Signal Processing (DSP) chip and possibly other chips (e.g., a hardware modem).

In the following discussion, we describe the device architecture shown in FIG. 14, and then discuss a number of alternative architectures. In FIG. 14, the processing workload is shared between a CPU (1402) and a DSP called a Telephone Answering Device (TAD) (1404). As explained in further detail, a variety of telephony related program modules might be executed either in the host CPU or the TAD.

The CPU and TAD each have access to a memory system (1406) that stores program code and data. The memory system of the device may include a combination of Read Only Memory (ROM) (1408) and Random Access Memory (RAM) (1410) as shown, as well as other conventional memory devices such as Flash memory and ADRAM (Audio DRAM). The CPU and TAD may access a shared memory system via a common memory bus (1412) as shown, or alternatively, they may have their own memory systems that they access via a private bus. The CPU and TAD may also use a combination of shared and private memory. For example, a TAD chip may have a dedicated Flash/ADRAM device.

The program code and associated data of the software platform may be stored on a variety of computer readable media. Typically, it is installed on the ROM of the telephony device and loaded into RAM at runtime. The program code and its data may be distributed on a conventional storage media such as compact disk and loaded into the device's memory system by the manufacturer or end user. Alternatively, the code and data may be transmitted electronically via a telephone communication line connected to the device or via a computer network, and then installed by the user or by the device, for example, when it is re-booted.

There are a variety of alternative ways to enable remote updating of telephony features, and specifically features enabled through call slip components. These alternatives include updating the entire program image on the device, updating only the program files and data that have changed or are new, or installing code to support an array of features and then selectively enabling features.

The specific implementation of these alternatives depends in part on the configuration of the hardware. For example, in some devices, the memory system includes ROM and RAM memory. The RAM memory may further include a DRAM memory with a portion that serves as working memory (e.g., acts as storage for the operating system's memory heap) and another portion that serves as an object store (e.g., acts as storage for the operating system's file system). In addition, the device may include a flash memory to store data persistently such as the contact database, email data files, etc. In the current implementation, the contact database is a Windows® CE database, which has a size limitation of 64 kB per record. Flash memory has the advantage that it does not require a battery, but depending on the implementation, may have limitations in the way data can be stored on it (e.g., such as the 64 kB limitation of Windows® CE databases mentioned previously).

To implement remote updating using the first approach, the implementer may create an installer application that would be downloaded and run in the DRAM. It is responsible for partitioning a downloaded code image into chunks (e.g., each 64 kB) and loading these chunks into the flash memory. Instead of replacing the entire code image with a new, downloaded image, the installer could be designed to update the current code image with new, downloaded portions of the image that have changed or are new. Yet another approach to updating telephony features, and in particular call slip features, is to download an application program that turns on a key in the registry to activate a telephony component associated with that key.

The architecture shown in FIG. 14 supports two telephone lines (1420, 1422). The signal path of for each line is similar. Each telephone line connects to a standard telephone jack (RJ11). The telephone jack is connected to a Direct Access Arrangement (DAA) module (1424, 1426), which in turn is connected to a crossbar (1428). A "crossbar" refers generally to a switching arrangement used to connect line terminating devices (e.g., handset audio, speakerphone audio, answering machine or modem) to a desired telephone line. Switches or crossbar arrangements are commonly used to switch codecs between DAA transformers. Software executing in the CPU uses the crossbar connected to the DAA modules to switch the modem and voice circuits (the TAD) to the available lines.

FIG. 14 shows a modem (1430) as a separate functional unit. The modem may be implemented in hardware or software. When implemented in software on the CPU, the CPU is connected to the crossbar via a serial interface (e.g., ST7546). When implemented in hardware, the CPU is connected to the hardware modem via a serial port, and the modem (1430) is connected to the crossbar (1428).

The TAD (1404) manages a variety of telephony functions relating to voice calls. As noted, it interfaces with the telephone line via a crossbar (1428) or equivalent switching arrangement. The TAD interfaces with the components familiar to the user, such as the speaker (1432), microphone (1434) and handset (1436), via a variety of standard drivers and switching arrangements, shown functionally as a crossbar (1430) in FIG. 14. In both cases, the TAD generally uses a codec chip to manage coding and decoding of the voice signal.

The device may also include a variety of peripherals connected to the CPU via a bus or collection of interface circuitry (1450). These peripherals include a display (1452), keyboard (1454), Infrared Data Association (IrDA) compliant transceiver (1456), PCMCIA port (1458), serial port (1460), etc. The device preferably includes an input device (1462) that allows the user to select user interface controls on the display, such as a cursor control device or touch screen. The device may also be implemented to support voice activated input with a combination of hardware (e.g., the microphone) and software to decode and perform voice recognition of voice signals.

As noted above, the telephony device may execute telephony programs in the host CPU, a TAD or other hardware components.

These functions include: voice compression, Dual Tone MultiFrequency (DTMF) detection, DTMF generation, modem functions, speaker phone functions (for full duplex speaker phones, this functionality may include double talk detection, acoustic and near end echo cancellation), digital telephone answering machine functions, and Analog Display Services Interface (ADSI) signaling.

ADS1 is a Bellcore standard defining a protocol on the flow of information between something (a switch, a server, a voice mail system, a service bureau) and a subscriber's telephone, PC, data terminal or other communication device with a screen. ADSI signaling encompasses caller identification (CID) and Caller Identification on Call Waiting (CID CW). To implement CID, the caller's number and name are transmitted to the receiving device during the first and second ring signaling an incoming call. To implement CID CW, the caller's number and name are transmitted to the receiving device along with the call waiting signal. A modulation technique called Frequency Shift Keying (FSK) is used for the transmission of Caller ID and Call Waiting Caller ID data.

The devices used to support these telephony functions vary, depending on the implementation.

The following list provides some possible implementations:

1. Full host emulation where a CPU (e.g., a Digital Semiconductor StrongArm SA-100) implements DSP functional modules in software. The software modules may include a V.34 software modem, an ADSI module, a speakerphone module, digital telephone answering device module, and a DTMF module.
2. Partial host emulation in a CPU (e.g., a Digital Semiconductor StrongArm SA-100), with a caller ID chip and a hardware FSK modem.
3. Partial host emulation in a CPU (e.g., a PPC821) running a software modem, with a TAD chip that provides a full duplex speakerphone, TrueSpeech Compression, CID, CIDCW, and DTMF functions.
4. A DSP phone including a CPU (e.g., SA110), with a TAD chip that provides a full duplex speakerphone, TrueSpeech Compression, CID, CIDCW, and DTMF functions, and a hardware V.34 modem. In this implementation, the modem acts primarily as a data communication front end to the CPU.
5. A Voice modem implementation including a CPU (e.g., SA110) and a voice modem used to provide a speakerphone, call progress tone (CPT) generation, CID, DTMF, voice compression, and data modem.

In the last two cases, there is essentially no DSP software running on the host CPU, and therefore, the main requirement of the CPU is the ability to handle line management and user controls in a real time fashion. As illustrated in this brief list, there are a wide variety of possible implementations.

CONCLUSION

While the invention is described with reference to specific implementations, the scope of the invention is not limited to these implementations. The call slip UI elements have a number of features that are unique, whether considered alone or in combination with other features. Therefore, the specific combination of features shown above should not be construed as being a necessary element of a call slip interface.

In view of the many possible implementations of the invention, it should be recognized that the implementations described above is are only examples of the invention and should not be taken as a limitation on the scope of the invention.

We claim:

1. An extensible software system operable to manage telephony functions, the system comprising:
    a set of at least one programming object operable to present a user interface element and implement functionality associated with the user interface element, wherein the programming object provides access to its functionality via an application programming interface comprising at least one method for receiving events;
    wherein the system is operable to extend its functionality via the addition of one or more additional programming objects supporting the application programming interface to the set of at least one programming object; and
    wherein the application programming interface comprises a method called to indicate a backup is taking place.

2. The software system of claim 1 wherein the system supports downloading of the additional programming objects.

3. The software system of claim 1 wherein the events are directed to the set of at least one programming object from a plurality of telephony applications.

4. The software system of claim 1 wherein programming objects in the set encapsulate their respective functionality.

5. The software system of claim 1 wherein at least one of the additional programming objects encapsulates its own behavior.

6. The software system of claim 1 wherein the software system supports additional programming objects of an object class not included in the extensible software system.

7. The software system of claim 1 wherein the software system supports additional programming objects of an object class developed after the extensible software system was developed.

8. The software system of claim 1 wherein the system supports adding the additional programming objects to the system by a user, wherein the additional programming objects are developed by a developer other than the user.

9. The software system of claim 1 wherein the system supports additional programming objects added after development of the software system, wherein the additional programming objects are developed by a third party developer.

10. The software system of claim 1 wherein the system supports additional objects comprising plug in panes.

11. The software system of claim 1 wherein the system supports addition of the additional programming objects, wherein the addition is under control of a remote location.

12. The software system of claim 1 further comprising: a telephony user interface presenter operable to provide a user interface for telephony applications via the programming object set.

13. The software system of claim 12 wherein the telephony user interface presenter exposes an application programming interface having at least one method having functionality similar to a method of the application programming interface of at least one programming object of the programming object set.

14. The software system of claim 12 wherein the telephony user interface presenter exposes an application programming interface similar to the application programming interface of at least one programming object of the programming object set.

15. The software system of claim 12 wherein the telephony user interface presenter is operable to direct events from the telephony applications to the programming object set.

16. The software system of claim 12 wherein the telephony user interface presenter comprises a call slip manager.

17. A computer readable medium comprising the following for adding user interface features to an extensible telephony application:
a set of one or more user interface control programming objects having computer executable code to generate user interface controls in a user interface and further having computer executable code to process telephony events directed from one or more telephony monitoring programs;
wherein the user interface control programming objects expose a programming interface comprising at least one method for receiving telephony events originating from the telephony monitoring programs;
wherein the programming interface comprises a method called to indicate a backup is taking place; and
wherein the user interface control programming objects encapsulate their own behavior.

18. The medium of claim 17 wherein:
the user interface control programming objects expose a programming interface comprising at least one method for receiving telephony events received via a programming object having executable code to generate a user interface; and
the programming object has an application programming interface having at least one method mirroring a method of the application programming interfaces for the user interface control programming objects.

19. The medium of claim 18 wherein the at least one mirrored method is operable to receive telephony events.

20. A method of processing telephony event notifications received by an object, the method comprising:
via a programming interface of the object, receiving by the object a telephony event notification indicative of telephony information, wherein the programming interface of the object comprises a method called to indicate a backup is taking place;
processing the event with the object; and
forwarding by the object of the event notification to objects designated as contained within the object via programming interfaces of the objects designated as contained within the object.

21. The method of claim 20 wherein the telephony information indicates a telephone line state change.

22. The method of claim 20 wherein the processing comprises depicting a change in a user interface responsive to the telephony event.

23. The method of claim 20 wherein the programming interface of the object and the programming interfaces of the objects designated as contained within the object comprise at least one mirrored method.

24. A computer readable medium comprising computer readable instructions for performing the method of claim 20.

25. An extensible telephony software system providing telephony functionality and a user interface, the software system comprising:
a plurality of telephony monitoring applications for sensing changes in telephone line state and notifying one or more user interface objects;
a user interface manager for controlling the one or more user interface objects and facilitating communication within the software system;
the one or more user interface objects, wherein the user interface objects control display in regions of a user interface, receive notifications sent by the telephony monitoring applications, and forward the notifications to user interface control objects;
the user interface control objects, wherein the user interface control objects comprise a programming interface and are operable to present user interface controls in the user interface, and receive notifications sent by the telephony monitoring applications through the programming objects, wherein a programming interface for the user interface objects and the programming interface for the user interface control objects have at least one mirrored method;
wherein the programming interface of the user interface control objects comprises a method called to indicate a backup is taking place; and
wherein new functionality can be incorporated into the software system by providing additional user interface control objects supporting the programming interface of the user interface control objects.

26. The software system of claim 25 wherein the at least one mirrored method comprises a method for receiving telephony events.

27. An extensible user interface system for a telephony management system, the user interface system comprising:
means for providing a user interface for telephony applications and providing user interface access to a set of one or more programming objects; and
the set of one or more programming objects, wherein at least one of the programming objects is operable to present a user interface element and functionality associated with the user interface element, wherein the at least one programming object provides access to its functionality via an application programming interface comprising at least one method for receiving events directed from the telephony applications;
wherein functionality can be added to the system by adding one or more programming objects that support the application programming interface to the set;
wherein the application programming interface comprises a method called to indicate a backup is taking place.

28. A computer readable, medium comprising:
a set of executable user interface control programming objects operable to present user interface controls in a screen phone user interface, wherein the user interface control programming objects expose an application programming interface comprising at least one method for processing events directed from an executable user interface element programming object; and
the executable user interface element programming object, wherein the executable user interface element programming object is operable to present an element of the screen phone user interface, to expose an application programming interface comprising at least one method for receiving event notifications, and to forward received notifications to the user interface control programming objects;
wherein the application programming interface of the user interface control programming objects and the programming interface of the user interface element programming object both comprise a method called to indicate a backup is taking place.

29. The computer readable medium of claim 28 wherein the application programming interface of the user interface control programming objects and the programming interface of the user interface element programming object both comprise a method for receiving and processing events.

30. The computer readable medium of claim 28 further comprising:
a contained user interface element programming object having an application programming interface comprising a method for receiving event notifications, wherein the contained user interface element programming object is operable to present a contained element displayed within a user interface element and to forward directives received from the display programming object to user interface control programming objects designated as belonging to the contained element.

31. The computer readable medium of claim 30 wherein the contained element is activated by adding information listing a class of the contained user interface element programming object in a configuration store.

32. The computer readable medium of claim 31 wherein the contained element is activated remotely.

33. The computer readable medium of claim 28 wherein the user interface element programming object comprises a programming interface for receiving telephone line state events from a program monitoring for state changes in the telephone line.

34. The computer readable medium of claim 33 wherein the user interface element programming object is operable to selectively display an indicator of the telephone line state in response to a telephone line state event.

35. The computer readable medium of claim 33 wherein the user interface element programming object is operable to display an indicator of caller ID information in response to a telephone line state event conveying the caller D information to the user interface element programming object.

36. The computer readable medium of claim 28 wherein the user interface element programming object logically contains one or more control objects, each control object having a programming interface, and each control object operable to present a user interface control in a portion of the display and responsive to user input to the user interface control.

37. The computer readable medium of claim 36 wherein the control object is operable to display a user interface control depending on telephone line state.

38. The computer readable medium of claim 28 further including a monitoring application;
wherein the monitoring application is operable to call a method in a programming interface of the user interface element programming object to inform the user interface element programming object of telephone line state changes.

39. A method of customizing a software system for a screen phone, wherein the software system comprises one or more monitoring applications monitoring telephone line state information, one or more default element objects presenting default elements in a user interface, and a display manager controlling the user interface and facilitating communication within the software system, the method comprising:
adding to the software system a custom element object that controls the display of a corresponding custom user interface element in the user interface;
wherein the custom element object exposes a programming interface comprising one or more methods that mirror one or more methods of a programming interface of the display manager and one or more methods of a programming interface of the default element objects, and wherein the custom element object is operable to receive telephone line state information and forward the information to one or more objects associated with the custom element via at least one of the mirrored methods;
wherein the programming interface exposed by the custom element object comprises a method called to indicate a backup is taking place.

40. The method of claim 39 including:
creating a custom user interface control to include in one of the default elements, the custom user interface control having a programming interface for receiving telephone state information.

41. The method of claim 39 including:
creating a custom user interface control to include in the custom element, the custom user interface control having a programming interface for receiving telephone state information.

42. The method of claim 39 including:
creating a custom monitoring application program; and
creating a custom user interface control to include in the custom element, the custom user interface control having a programming interface for receiving telephone state information from the custom telephony monitoring application program.

43. An extensible telephony software system providing telephony functionality and a displayed user interface, the software system comprising:
a plurality of telephony monitoring applications for sensing changes in telephone line state and sending notifications indicating telephone line state;
a set of one or more container objects operable to receive notifications indicating telephone line state from the telephony monitoring applications, the container objects further operable to present a user interface manifestation and forward the received notifications; and
a set of one or more containee objects operable to display a user interface control within the user interface manifestation and further operable to receive notifications originating from one or more of the plurality of telephony monitoring applications and forwarded by the container objects;
wherein additional functionality can be added to the software system by adding additional containee objects;
wherein an application programming interface of the containee objects and an application programming interface of the container objects both comprise a method called to indicate a backup is taking place.

44. The system of claim 43 wherein the container object and the containee objects have application programming interfaces comprising a method for receiving telephony events.

45. The system of claim 44 wherein the application programming interfaces comprise at least one method for receiving directives originating from one or more of the telephony monitoring applications.

46. The system of claim 43 wherein the container object and the containee objects have application programming interfaces comprising a method for indicating a change in telephone line state.

47. A method of conveying telephone line state information in a software system for a screen phone, wherein the software system comprises a monitoring application monitoring telephone line state information, one or more element objects controlling user interface elements in the display, and a display manager controlling the display of a user interface and facilitating communication within the software system, the method comprising;

forwarding telephone line state information from the monitoring application to the display manager, via a programming interface exposed by the display manager; and responsive to receipt of the telephone line state information by the display manager, forwarding the telephone line state information from the display manager to one or more element objects via a programming interface exposed by the one or more element objects;

wherein the programming interface exposed by the one or more element objects comprises a method called to indicate a backup is taking place.

48. The method of claim 47 wherein the programming interface exposed by the display manager comprises one or more methods common to one or more methods of the programming interface exposed by the one or more element objects.

49. The method of claim 47, wherein the software system further comprises one or more control objects, the control objects operable to present user interface controls in the user interface, the method further comprising:

forwarding the telephone line state information from the one or more element objects to the one or more control objects, wherein the one or more control objects expose a programming interface.

50. The method of claim 49 wherein the programming interface exposed by the one or more element objects comprises one or more methods common to one or more methods of the programming interface exposed by the one or more control objects.

51. The method of claim 49 wherein at least one of the element objects is supplied by an OEM.

52. The method of claim 47 wherein the element objects comprise control objects.

* * * * *